US011202053B2

(12) United States Patent
Joshi

(10) Patent No.: US 11,202,053 B2
(45) Date of Patent: *Dec. 14, 2021

(54) STEREO-AWARE PANORAMA CONVERSION FOR IMMERSIVE MEDIA

(71) Applicant: ADOBE INC., San Jose, CA (US)

(72) Inventor: Bhautik Jitendra Joshi, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/889,103

(22) Filed: Jun. 1, 2020

(65) Prior Publication Data

US 2020/0296349 A1    Sep. 17, 2020

Related U.S. Application Data

(63) Continuation of application No. 16/290,795, filed on Mar. 1, 2019, now Pat. No. 10,715,783.

(51) Int. Cl.
| | |
|---|---|
| *H04N 13/156* | (2018.01) |
| *G06T 15/06* | (2011.01) |
| *H04N 5/232* | (2006.01) |
| *H04N 13/178* | (2018.01) |
| *H04N 13/111* | (2018.01) |

(52) U.S. Cl.
CPC .......... *H04N 13/156* (2018.05); *G06T 15/06* (2013.01); *H04N 5/23238* (2013.01); *H04N 13/111* (2018.05); *H04N 13/178* (2018.05)

(58) Field of Classification Search
CPC ..... G06T 15/06; G06T 15/205; H04N 13/111; H04N 13/156; H04N 13/178; H04N 13/239; H04N 5/23238
See application file for complete search history.

(56) References Cited

U.S. PATENT DOCUMENTS

| | | | |
|---|---|---|---|
| 2003/0068098 A1* | 4/2003 | Rondinelli | G06T 3/0062 382/276 |
| 2006/0072176 A1* | 4/2006 | Silverstein | G06T 3/005 358/540 |

(Continued)

OTHER PUBLICATIONS

Bourke, Paul, "Spatial errors in stereoscopic displays", http://paulbourke.net/stereographics/stereo_error, Mar. 2017.

*Primary Examiner* — Mohammed S Rahaman
(74) *Attorney, Agent, or Firm* — Finch & Maloney PLLC

(57) ABSTRACT

Techniques are disclosed for conversion of panoramas between different panoramic projections, including stereoscopic panoramic projections. The pixels of one panoramic image are mapped to the pixels of another panoramic image using ray tracing so that the images can be combined without introducing visual distortions caused by mismatches in the optics of each image. The conversion is performed using a process for mapping one or more pixels of an output image to pixels of an input image by tracing a ray between the UV coordinates corresponding to each pixel in the images. The conversion process accounts for arbitrary projections and for arbitrary stereo camera rig configurations by using metadata that describe the projection and positioning of each image being combined. The origin of each ray is offset to account for the interpupillary distance between left and right images and to account for any rotation of the scene.

20 Claims, 17 Drawing Sheets

(56) References Cited

U.S. PATENT DOCUMENTS

| | | | |
|---|---|---|---|
| 2006/0238536 A1* | 10/2006 | Katayama | G06T 3/4038 345/427 |
| 2009/0100379 A1* | 4/2009 | Borchers | G09B 9/00 715/851 |
| 2010/0208032 A1* | 8/2010 | Kweon | G03B 37/00 348/36 |
| 2011/0285810 A1* | 11/2011 | Wagner | H04N 5/23238 348/36 |
| 2013/0010084 A1* | 1/2013 | Hatano | G03B 35/08 348/47 |
| 2013/0077890 A1* | 3/2013 | Chen | G06T 5/002 382/275 |
| 2014/0313284 A1* | 10/2014 | Ohki | G06T 3/0062 348/36 |
| 2014/0375762 A1* | 12/2014 | Ohki | H04N 5/23238 348/36 |
| 2016/0292821 A1* | 10/2016 | Cho | G06T 3/4038 |
| 2016/0328833 A1* | 11/2016 | Kiyota | E02F 9/261 |
| 2017/0078570 A1* | 3/2017 | Ito | H04N 5/23238 |
| 2017/0358126 A1* | 12/2017 | Lim | G06T 3/0062 |
| 2018/0077210 A1* | 3/2018 | Hannuksela | H04N 21/47217 |
| 2018/0096453 A1* | 4/2018 | Edwards | H04N 13/122 |
| 2018/0124312 A1* | 5/2018 | Chang | H04N 19/597 |
| 2018/0359419 A1* | 12/2018 | Hu | H04N 5/23238 |

* cited by examiner

STEREO-AWARE PANORAMA CONVERSION FOR IMMERSIVE MEDIA

CROSS-REFERENCE TO RELATED APPLICATION

This application is a continuation of U.S. patent application Ser. No. 16/290,795, filed Mar. 1, 2019, the entire disclosure of which is hereby incorporated by reference herein.

FIELD OF THE DISCLOSURE

This disclosure relates generally to the field of digital image processing, and more particularly, to techniques for digital conversion of panoramas between different panoramic projections, including stereoscopic panoramic projections.

BACKGROUND

As opposed to conventional two-dimensional photography, panoramic photography provides a larger (wider, taller, or elongated) field of view than conventional photos. Because panoramas include a range of viewing angles of a scene taken from a single viewpoint, portions of the image appear distorted when the panorama is projected onto a planar surface. This distortion can be alleviated to some extent by instead projecting the panorama onto a three-dimensional (3D) sphere such that the viewer perceives the scene with the same vantage and viewpoint as the camera. Panoramic photos can also be stereoscopic (sometimes called stereo images or stereo panoramas), which further enhances the immersive visual effect by giving the viewer a greater illusion of depth than found in conventional photography, simulating a scene in three dimensions. Stereoscopic photography presents separate images to the left and right eyes of the viewer, instead of a single image to both eyes. The cameras for the left and right images are offset to simulate the interpupillary distance of the human eyes, thereby providing stereopsis for binocular vision. A specialized camera or camera rig can be used to photograph a panorama stereoscopically or the panoramic images can be computer-generated. Some cameras or camera rigs provide the ability to take stereoscopic (three-dimensional) panoramic photographs, typically by shooting from two locations that are offset by an interpupillary distance (IPD), which is the distance between the centers of the pupils of the eyes (i.e., the left and right viewpoints of the camera or camera rig). This imaging technology creates a multidimensional effect with a panoramic field of view of up to 360 degrees in any direction for an immersive media experience, where the images appear to at least partially surround the viewer when projected onto a non-planar surface. However, there are complex and non-trivial issues associated with stereo panorama image processing due to the multidimensional nature of those images.

BRIEF DESCRIPTION OF THE DRAWINGS

The accompanying drawings are not intended to be drawn to scale.

DETAILED DESCRIPTION

Figure 1:
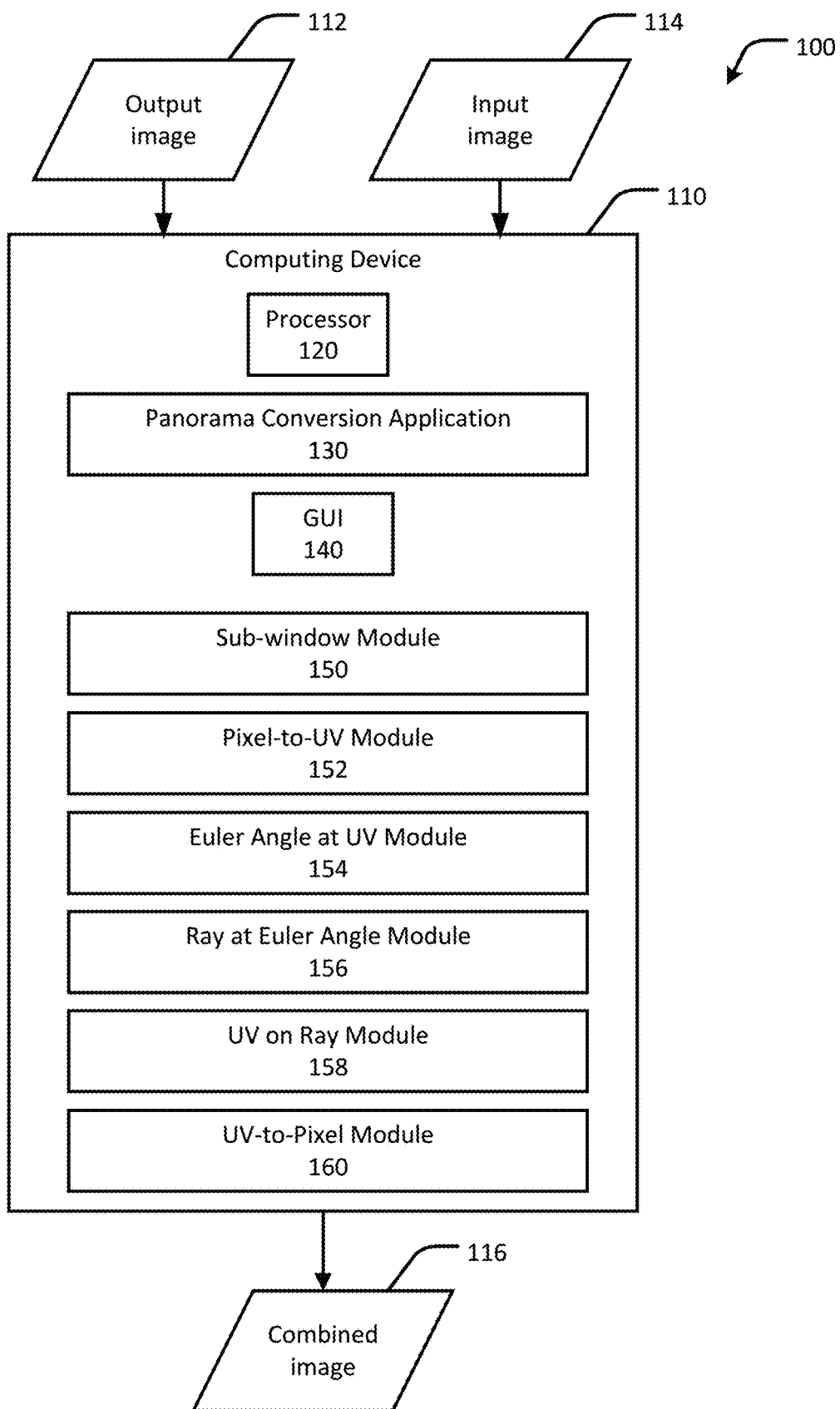
FIG. 1 shows an example system for converting panoramas between different panoramic projections, in accordance with an embodiment of the present disclosure.

Combining panoramic images with different projections while minimizing the introduction of visual distortions is a non-trivial problem. To this end, techniques for converting panoramas between different panoramic projections, including stereoscopic panoramic projections, are disclosed. Briefly, and according to an embodiment, the pixels of one panoramic image are mapped to the pixels of another panoramic image using ray tracing so that the images can be combined without introducing visual distortions caused by mismatches in the optics of each image. For example, one or more pixels of an output image are mapped to pixels of an input image by tracing a ray between the UV coordinates corresponding to each pixel in the images. UV coordinates are two-dimensional texture coordinates that correspond with the vertex information of a given geometry to which that texture is to be applied. The UV coordinates effectively define which pixels of a given texture correspond to which vertices of a 3D object model. As will be further explained below, the disclosed ray tracing techniques account for arbitrary projections and for arbitrary stereo camera rig configurations by using metadata that describe the projection and positioning of each image being combined. For instance, and according to some embodiments, the origin of each ray is offset in UV space to account for the interpupillary distance between left and right images and to account for any rotation of the scene.

General Overview

As previously explained, there are non-trivial problems associated with processing stereoscopic panoramic photographs. For example, visual aberrations can become apparent in stereoscopic panoramas when the optics of the camera(s) are mismatched to the optics of the viewer, for instance by causing objects in the image to appear distorted or too close to or too distant from the viewer, which leads to viewer discomfort. This problem is further exacerbated when stereoscopic images from several different panoramic projections are combined because the optical mismatches in each projection can create additional visual discontinuities, for instance by causing objects to appear improperly located with respect to each other. Such mismatches can occur, for example, when the respective projections are created by cameras having mismatched optics, or when the optics of a computer-generated projection differ from the optics of a camera image with which the computer-generated projection is combined. Mismatches can also occur when the scene in one projection is rotated to a different extent than the scene in the other projection.

To this end, and in accordance with an embodiment of the present disclosure, techniques are disclosed for conversion of panoramas between different panoramic projections, including stereoscopic panoramic projections. The disclosed techniques can be used with any type of panoramic image, including, for example, 180-degree stereo panoramas and 360-degree stereo panoramas (sometimes referred to as omnidirectional stereo or ODS), as well as with planar (two-dimensional) projections. In an embodiment, the pixels of one panoramic image are mapped to the pixels of another panoramic image using ray tracing so that the images can be combined without introducing visual distortions caused by mismatches in the optics of each image. The conversion is performed using a process for mapping one or more pixels of a first image, referred to as an output image, to pixels of a second image, referred to as an input image, by tracing a ray between the UV coordinates corresponding to each pixel in the images. The conversion process accounts for arbitrary projections and for arbitrary stereo camera rig configurations by, for example, using per-image parameters, or metadata, that describe the projection and positioning of each image being combined. The projection of the images defines a transformation of two-dimensional (2D) images that map to a 3D spherical surface, and the positioning of the images defines rotations (such as pan and tilt) and other adjustments of the 3D sphere relative to a fixed coordinate system. The origin of each ray is offset to account for the IPD between left and right images in the panorama (in the case of stereo) and to account for any rotation of the scene with respect to the viewer.

In one embodiment according to the present disclosure, a methodology for converting panoramic images between different panoramic projections is as follows. For each of a plurality of pixels in an output image, UV coordinates are obtained. The UV coordinates correspond to a respective pixel in the output image. In some embodiments, the UV coordinates can be obtained based on metadata associated with the output image. As will be appreciated, this metadata is descriptive of the output image and either includes the corresponding UV coordinates or otherwise allows those UV coordinates to be determined. The UV coordinates represent a two-dimensional texture associated with the respective pixel in the output image. Then, for each of the pixels in the output image, Euler angle coordinates are calculated at the respective UV coordinates, based on the metadata associated with the output image, and the Euler angle coordinates are mapped to a geometric ray. For each such geometric ray, an intersection between the respective geometric ray and an input image is calculated, wherein the intersection represents UV coordinates corresponding to one of a plurality of pixels in an input image. For each such intersection, the UV coordinates at the respective intersection to one of the pixels in the input image are calculated, based on metadata associated with the input image. As will be appreciated, the metadata associated with the input image is descriptive of the input image and either includes the corresponding UV coordinates or otherwise allows those UV coordinates to be determined. In addition, for each such intersection, one or both of a combined panoramic image and/or metadata descriptive of the combined panoramic image is/are generated, based on the converted pixel in the input image. The combined panoramic image represents a combination of the output image and the input image. Thus, a panoramic image can be provided that has no or relatively few visual distortions caused by mismatches in the optics of each image.

System Architecture

FIG. 1 shows an example system 100 for converting panoramas between different panoramic projections, in accordance with an embodiment of the present disclosure. The system 100 includes a computing device 110 having a processor 120, a Panorama Conversion Application 130, and a graphical user interface (GUI) 140. The GUI 140 includes a display and user input device. The processor 120 of the computing device 110 is configured to execute the following modules, each of which is described in further detail below: Sub-window Module 150, Pixel-to-UV Module 152, Euler Angle at UV Module 154, Ray at Euler Angle Module 156, UV on Ray Module 158, and UV-to-Pixel Module 160. The computing device 110 is further configured to receive, as inputs, a digital output image 112 and a digital input image 114. The output image 112 and the input image 114 represent panoramic projections to be processed by the system 100. The computing device 110 is further configured to produce, as an output, a combined image 116 that is based at least in part on the output image 112 and the input image 114. The combined image 114 is a digital image that retains the content of the output image 112 and the input image 114 but with adjustments to correct optical mismatches between the images, such as variously described in this disclosure. Any number of standard or proprietary digital images (e.g., JPEG, bitmap, PNG, TIFF, QuickTime VR, and PANO) can be used for the output image 112, the input image 114, and the combined image 116. Each of the modules 150, 152, 154, 156, 158, and 160 can be used in conjunction with each other to convert panoramic images between different types of projections, with the conversion process producing the combined image 116 or metadata associated with the combined image 116.

Example Scenarios

An example problem being solved by an embodiment of the present disclosure is further explained below with reference to the scenarios shown in FIGS. 2A and 2B.

Figure 2A:
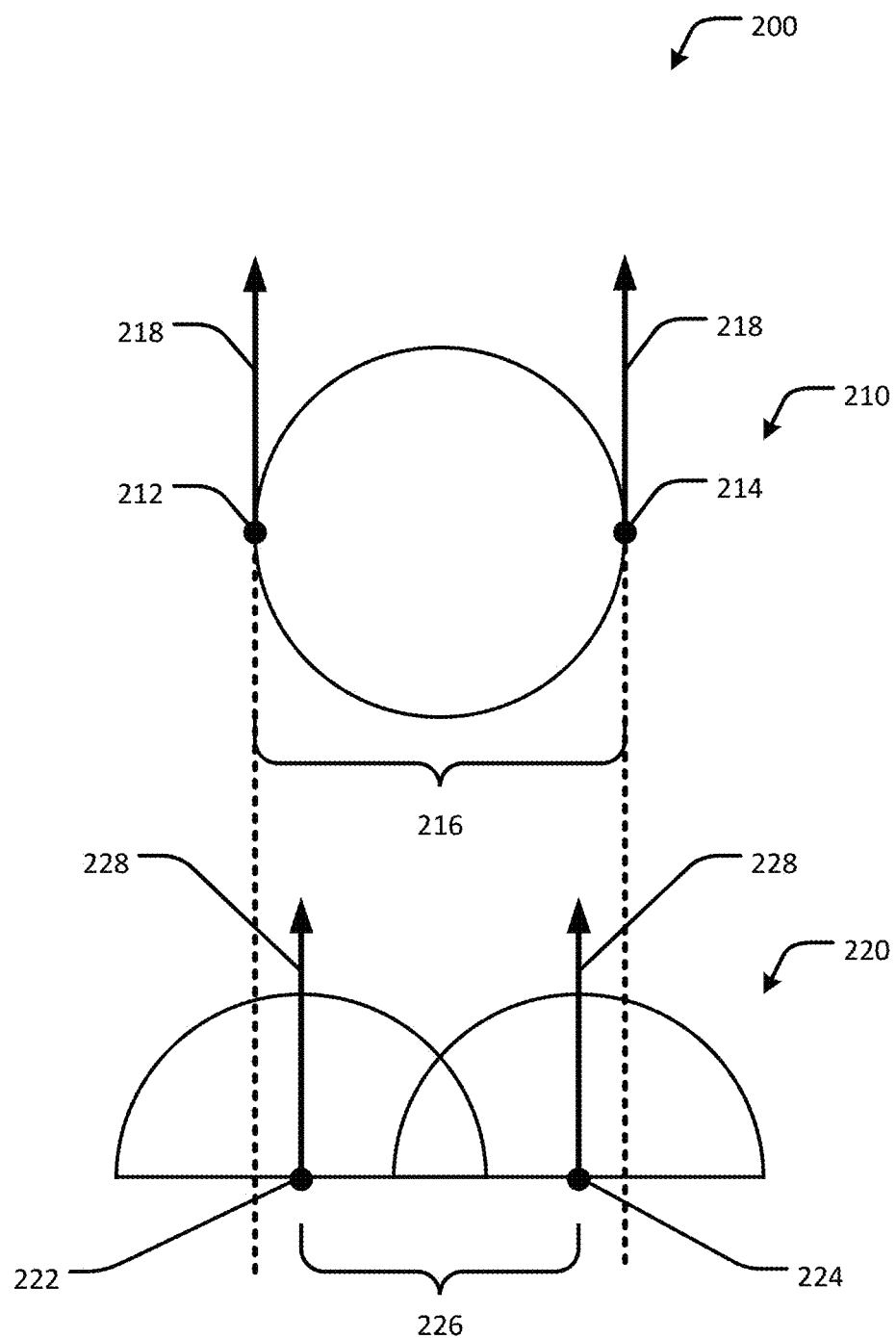
FIGS. 2A and 2B each show an example configuration of a 360° stereoscopic projection and a 180° stereoscopic projection, in accordance with an embodiment of the present disclosure.

FIG. 2A shows an example configuration 200 of a 360° (ODS) stereoscopic projection 210 and a 180° stereoscopic projection 220. The 360° projection 210 is obtained using two cameras 212 and 214 or using a camera rig that captures images from the locations indicated at 212 and 214. The cameras 212 and 214 are separated by an IPD 216. Arrows 218 indicate a forward viewing direction from the cameras 212 and 214 within the 360° projection 210. The 180° projection 220 is obtained using two cameras 222 and 224 or using a camera rig that captures images from the locations indicated at 222 and 224. The cameras 222 and 224 are separated by an IPD 226, which may be different than the IPD 216. Arrows 228 indicate a forward viewing direction from the cameras 222 and 224 within the 180° projection 210.

However, if the IPD 216 of the 360° projection 210 is different from the IPD 226 of the 180° projection 220, then there is a mismatch between the optics of the two projections. Specifically, the left and right eye views, represented by cameras 212 and 214, and cameras 222 and 224, respectively, are separated by different distances, which affects the viewer's perception of the scenes in each projection 210 and 220 to differ. Therefore, when the 360° projection 210 is combined with the 180° projection 220, the left and right eye views of the combined projection will not be aligned, causing undesirable visual distortions.

Figure 2B:
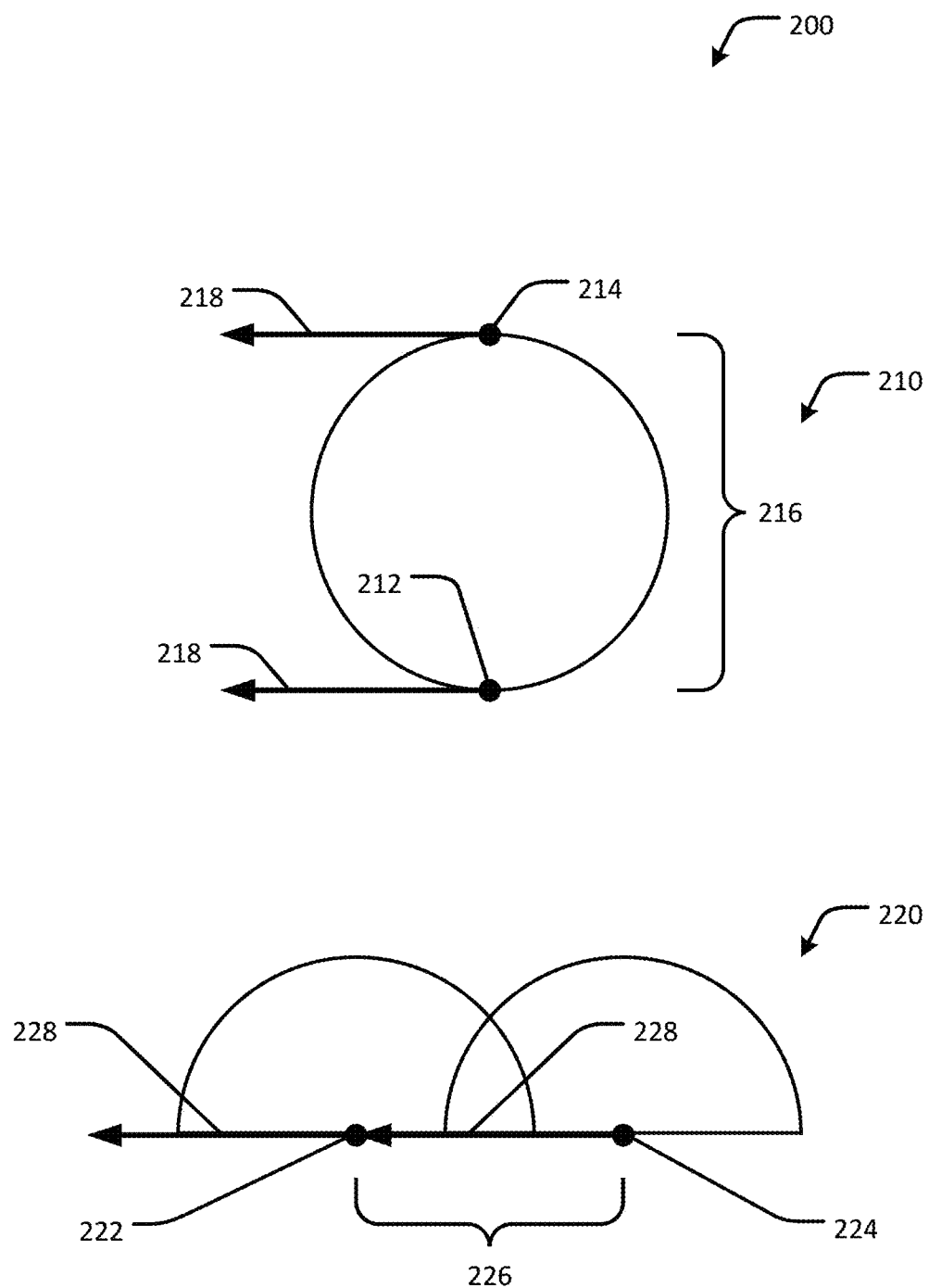

FIG. 2B shows the same example configuration 200 of projections 210 and 220 as FIG. 2A. In FIG. 2B, the arrows 218 and 228 indicate a leftward viewing direction within the projections 210 and 220, and the cameras 212 and 214 in the 360° projection 210 are oriented differently than in FIG. 2A. In this case, there is also a mismatch between the optics of the two projections because of the different orientation of the cameras and the different viewing angles within the projections 210 and 220. While the 360° projection 210 is stereoscopic (cameras 214 and 218 are separated by IPD 216 along an axis perpendicular to the viewing direction), the 180° projection 220 effectively becomes monoscopic because the cameras 222 and 224 are aligned along the same axis as the viewing direction (the IPD is effectively reduced to zero), as indicated by the arrows 228. Therefore, when the 360° projection 210 is combined with the 180° projection 220, the left and right eye views of the two projections again will not be aligned, causing undesirable visual distortions.

Therefore, it is desirable to convert panoramic projections in a manner that compensates for misaligned optics when two or more projections are combined such that the resulting combination does not suffer from visual distortions, such as discussed above.

Methodology

Figure 3:
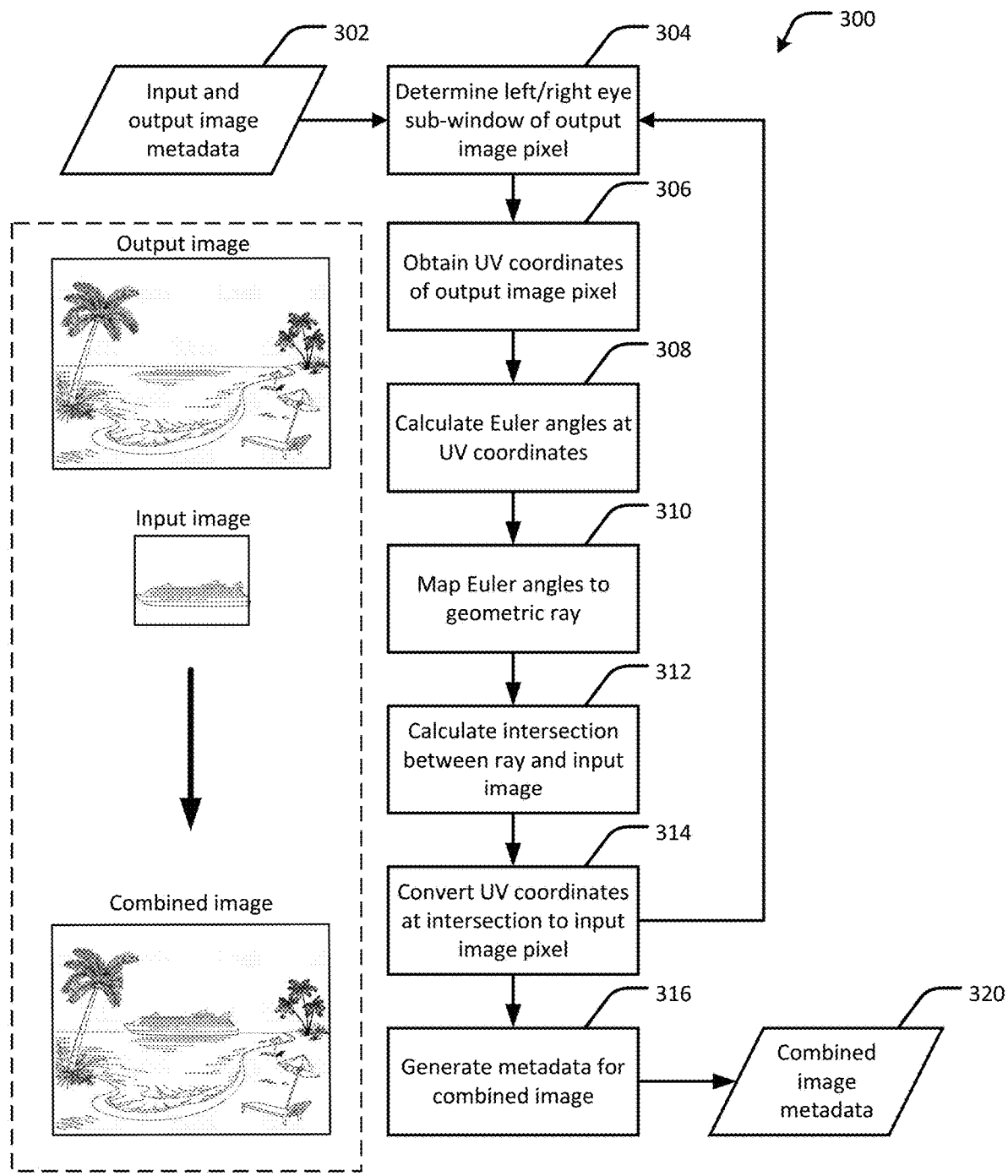
FIG. 3 is a flow diagram of an example methodology for converting panoramas between different panoramic projections, in accordance with an embodiment of the present disclosure.

FIG. 3 is a flow diagram of an example methodology 300 for converting digital panoramas between different panoramic projections, in accordance with an embodiment of the present disclosure. The methodology 300 can be implemented, for example, in the Panorama Conversion Application 130 and in various modules 150-160 of FIG. 1. Generally, the methodology 300 maps each pixel in the output image 112 to a pixel in the input image 114 using ray tracing in a manner that accounts for optical misalignments between the two images. As a result, the output image 112 and the input image 114 can be combined without introducing visual distortions caused by mismatches in the optics of each image. The conversion is performed using a process for mapping one or more pixels of the output image 112 to pixels of the input image 114 by tracing a ray between the UV coordinates corresponding to each pixel in the images.

Note that at least some of the steps described below can be performed in a different sequence than described in this disclosure, and that it is not necessary to strictly adhere to the described sequence in every circumstance. Further note that each of the steps can be repeated more than once, such as when oversampling or anti-aliasing the pixels.

In summary, the method 300 includes the following steps, which will be described in further detail in the following paragraphs of this disclosure: For each pixel in the output image 112, determine (304) whether the respective pixel is within a left eye sub-window of the output image or within a right eye sub-window of the output image. This step can be implemented, for example, in the Sub-window Module 150 of FIG. 1. Next, for each pixel in the output image 112, obtain (306) UV coordinates corresponding to the respective pixel in the output image 112 based on metadata associated with the output image 112. The UV coordinates represent a two-dimensional texture associated with the respective pixel in the output image 112. This step can be implemented, for example, in the Pixel-to-UV Module 152 of FIG. 1.

Next, for each pixel in the output image 112, calculate (308) Euler angle coordinates at the respective UV coordinates based on the metadata associated with the output image 112. This step can be implemented, for example, in the Euler Angle at UV Module 154 of FIG. 1. Next, for each pixel in the output image 112, map (310) the Euler angle coordinates to a geometric ray. This step can be implemented, for example, in the Ray at Euler Angle Module 156 of FIG. 1. Next, for each geometric ray, calculate (312) an intersection between the respective geometric ray and the input image 114. The intersection represents UV coordinates corresponding to one of a plurality of pixels in an input image 114. This step can be implemented, for example, in the UV on Ray Module 158 of FIG. 1. Next, for each intersection, convert (314) the UV coordinates at the respective intersection to one of the pixels in the input image 114. Metadata associated with the input image 114 can be used to perform this conversion, such as where the metadata represents a mapping or other relation between the pixel coordinates and the UV coordinates as defined for the projection and positioning of a given image. This step can be implemented, for example, in the UV-to-Pixel Module 160 of FIG. 1. Next, for each intersection, generate (316) metadata associated with a combined panoramic image based on the converted pixel in the input image 114. The combined panoramic image represents a combination of the output image and the input image.

In further detail, the output image 112 can be encoded with metadata 302 representing, among other things, positional parameters of a sub-window within the image, measured in pixels (width and height), and the region within the projection that each pixel maps to, in UV (texture) coordinates. UV mapping is a technique for projecting a 2D image to the surface of an object modeled in 3D, which paints a texture onto the surface of the modeled object. The letters "U" and "V" denote the axes of the 2D texture. UV coordinates can be represented as a tuple (u, v), representing a position in the output image.

Figure 4:
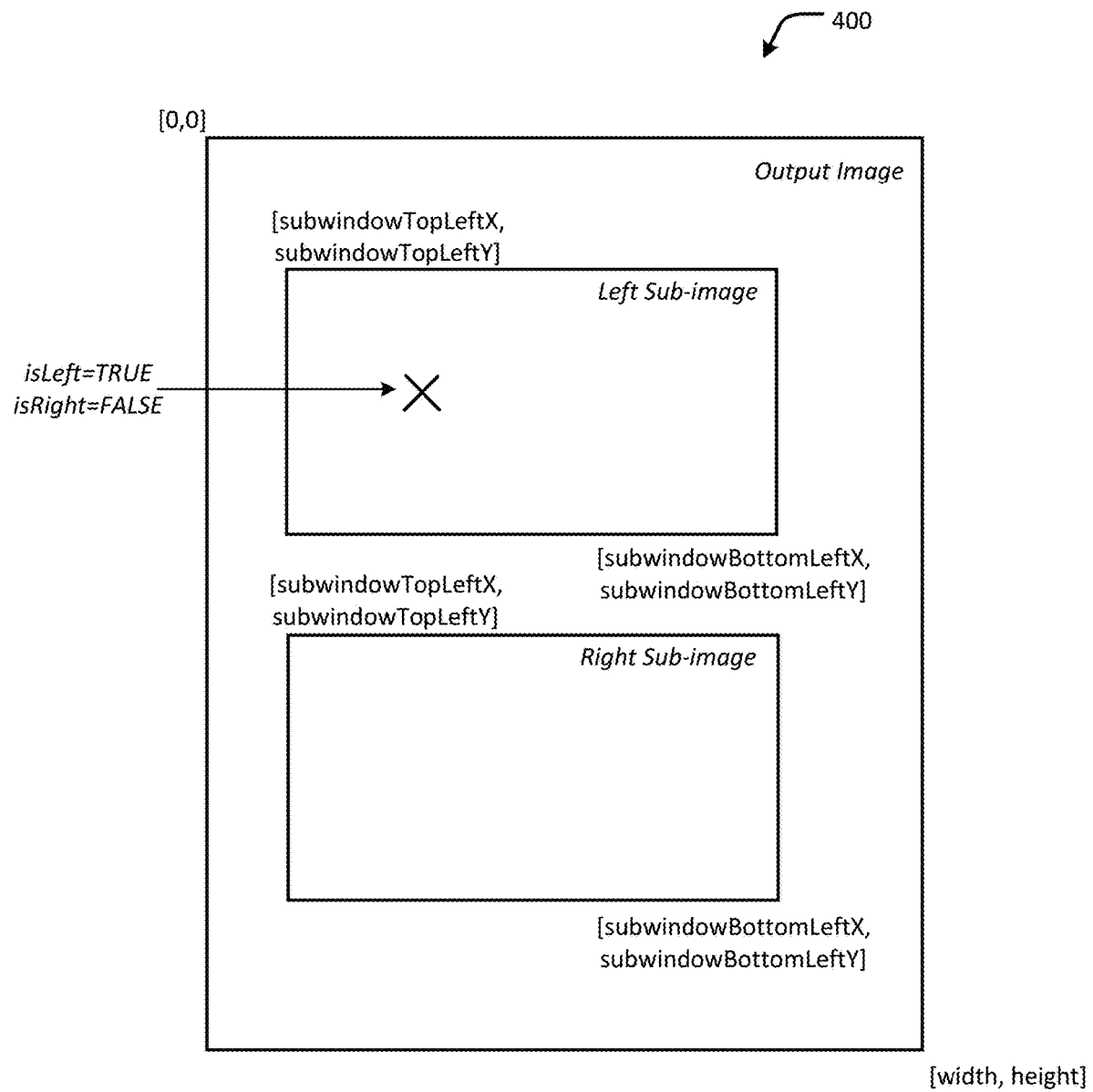
FIGS. 4 and 5 each show an example output image, in accordance with an embodiment of the present disclosure.
Figure 5:
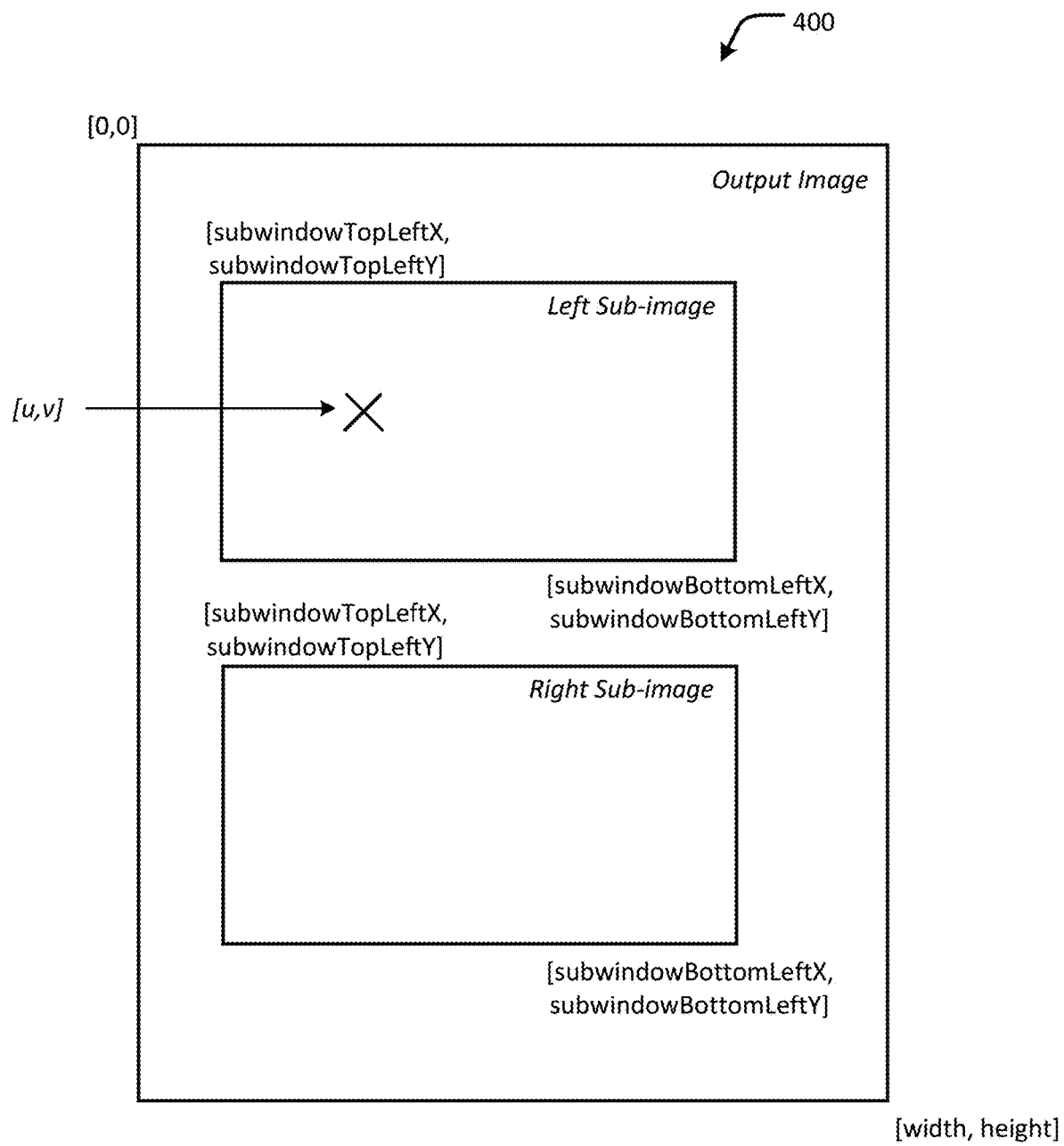

FIGS. 4 and 5 each show an example output image 400, in accordance with an embodiment. The output image 400 includes a plurality of pixels, including one such pixel indicated as "X" in FIGS. 4 and 5. Each pixel in the output image 400 is located at a different Cartesian coordinate within the output image.

Referring to FIG. 3, the first step of the method 300 for converting panoramic projections is to determine 304, for each pixel in the output image 400, whether the respective pixel coordinate is within a left eye sub-window of the output image or within a right eye sub-window of the output image, as defined, for example, by the metadata 302 parameters for the image. As shown in FIG. 4, the left and right eye sub-windows define separate regions or sub-images of the output image 400 containing pixels in the left eye sub-image and the right eye sub-image, respectively, for stereo images. The left and right eye sub-image can, for example, be placed side-by-side or above and below each other within the full output image 400. If the projection is not stereo, then the sub-windows represent the entire projection or a smaller area within the projection and are the same size as or smaller than the image. As shown in FIG. 4, the pixel indicated at "X" is in the left eye sub-image. This portion of the process is both projection-agnostic and stereo-agnostic as it produces a binary result from the determination that the pixel is either within the left sub-image or the right sub-image.

Referring to FIG. 3, the next step of the method 300 is to obtain 306 the UV coordinate for the pixel, for example, from metadata that describes the projection and positioning of the output image. As described above, the projection defines a transformation of the image that maps to a 3D spherical surface, and the positioning defines rotations (such as pan and tilt) and other adjustments of the 3D sphere relative to a fixed coordinate system. As shown in FIG. 5, the pixel indicated at "X" has UV coordinates [u, v]. For example, these UV coordinates are retrieved from the metadata of the output image 400. This step is also both projection- and stereo-agnostic. Example pseudo-code for implementing this step is as follows:

```
UV PixelCoordinateToUV(PixelCoordinate xy, Subwindow sub){
    // if we're out of the bounding box of subwindow
    // in the image then return null
    if (xy.x<sub.xyTop.x || xy.y<sub.xyTop.y ||
        xy.x>sub.xyBottom.x || xy.y>sub.xyBottom.y)
        return null;
    int subWindowWidth = sub.xyBottom.x - sub.xyTop.x;
    int subWindowHeight = sub.xyBottom.y - sub.xyTop.y;
    PixelCoordinate xyLocal;
    xyLocal.x = xy.x - sub.xyTop.x;
    xyLocal.y = xy.y - sub.xyTop.y;
    double halfPixelU = 0.5 / double(subWindowWidth);
    double halfPixelV = 0.5 / double(subWindowHeight);
    uv.0 = xyLocal.x * 2.0 * halfPixelU + halfPixelU;
    uv.v = xyLocal.y * 2.0 * halfPixelV + halfPixelV;
    return uv;
}
PixelCoordinate UVToPixelCoordinate(UV uv, Subwindow sub){
    // if we're out of the bounding box of the projection visible
    // in the image then return null
    if (uv.u<sub.uvTop.u || uv.v<sub.uvTop.v ||
        uv.u>sub.uvBottom.u || uv.v>sub.uvBottom.v)
        return null;
    // normalize UV coordinate to 0..1
    UV uvLocal;
    uvlocal.u = (uv.0 - sub.uvTop.u)/(sub.uvBottom.u - sub.uvTop.u);
    uvLocal.v = (uv.v - sub.uvTop.v)/(sub.uvBottom.v - sub.uvTop.v);
    int windowWidth = sub.xyBottom.x - sub.xyTop.x;
    int windowHeight = sub.xyBottom.y - sub.xyTop.y;
    // find pixel coordinate, offset by subwindow specified in sub
    PixelCoordinate xy;
    xy.x = sub.xyTop.x + min(int(floor(uvLocal.u * float(windowWidth))),
        windowWidth - 1);
    xy.y = sub.xyTop.y + min(int(floor(uvLocal.v * float(windowHeight))),
        windowHeight - 1);
    return xy;
}
```

Figure 6:
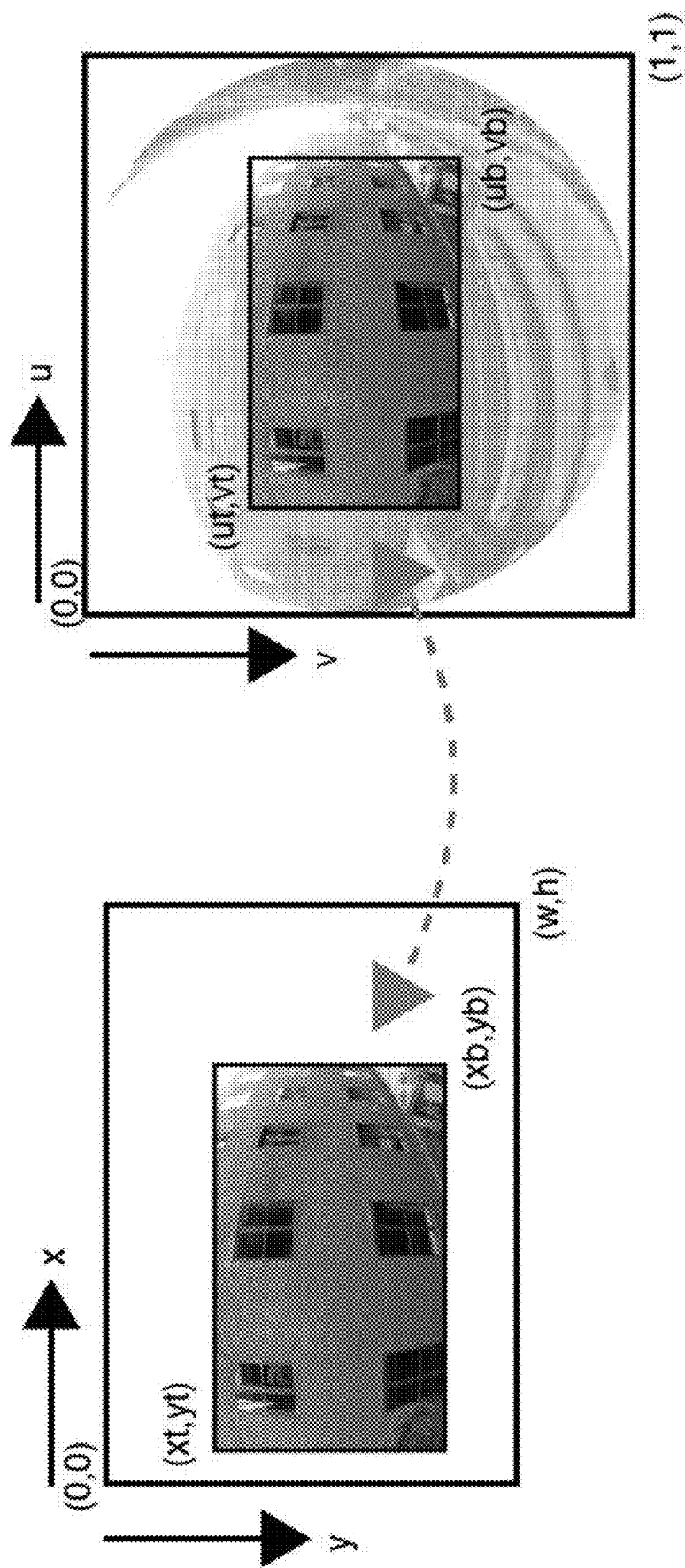
FIG. 6 shows an example image located in pixel and UV coordinates.

FIG. 6 shows an example image located in pixel (x, y) and UV (u, v) coordinates, respectively. The pixel coordinates can be mapped to the UV coordinates and vice versa. In this manner, the UV coordinates of a given pixel can be identified from the pixel's coordinates, and the pixel corresponding to a given UV coordinate can also be identified using the mappings.

Figure 7:
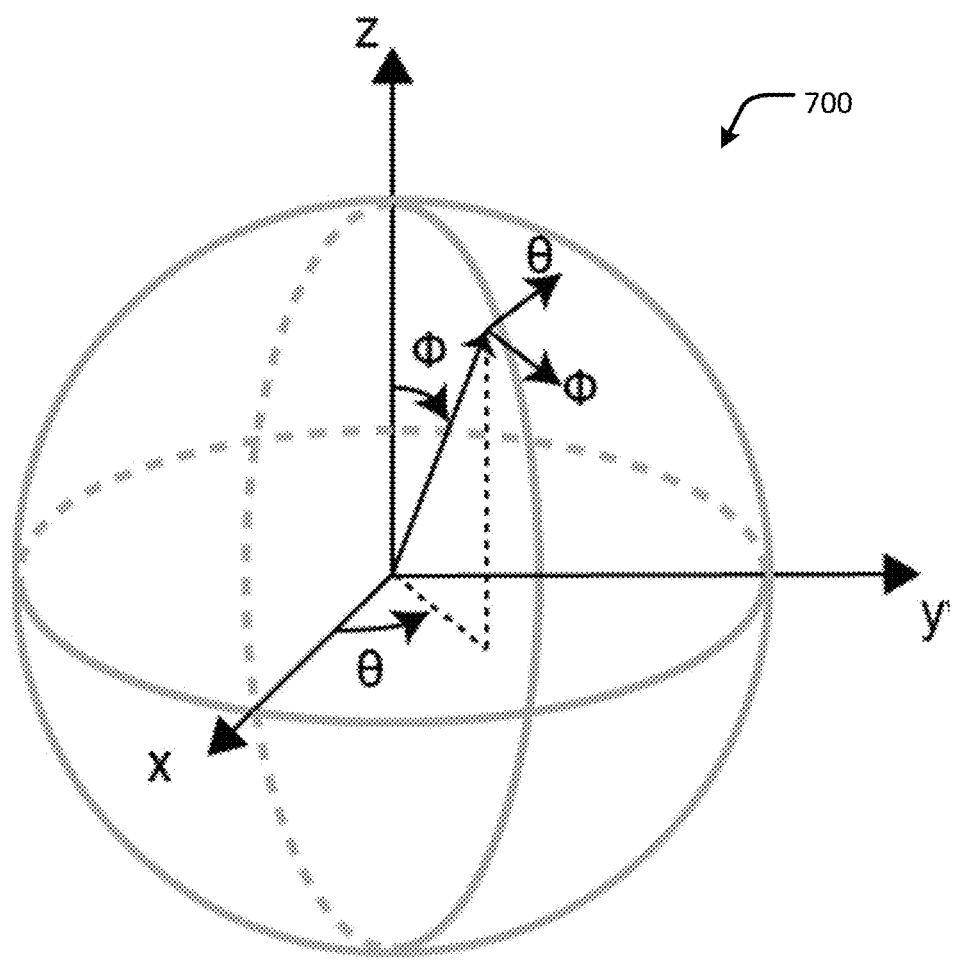
FIGS. 7-11 each show an example image coordinate system that can be used in conjunction with various embodiments of the present disclosure.

FIG. 7 shows an example image coordinate system 700 that can be used in conjunction with the techniques disclosed herein. The coordinate system has an origin at the center of a sphere, as indicated by the axes x, y, and z in FIG. 7. The coordinate system 700 is based on the ISO 80000-2:2009 convention with azimuth theta (around the z-axis) and inclination phi (measured from the z-axis). In this coordinate system 700, the viewer looking straight ahead is looking along the positive x axis with the z axis pointing straight upwards. The Euler angles are represented by theta for longitude (ascension), phi for latitude (declination) and psi for rotation of the image with respect to the viewer.

Referring to FIG. 3, the next step of the method 300 is to calculate 308 Euler angle coordinates for the pixel in the output image 112 from the UV coordinates of the 2D texture. The Euler angle coordinates represent the orientation of the projection with respect to the viewer as a direction of a geometric ray extending from the UV coordinate in the corresponding planar (2D) image. The ray effectively maps the UV coordinates to the positioning of the image (i.e., pan and tilt). This step depends on the projection of the image, but it is stereo-agnostic because the Euler angle coordinates are calculated separately for the left and right eye images. A non-exhaustive list of example projection types includes equirectangular, side-by-side fisheye, fisheye, cubemap, cylindrical, planar, and stereographic.

Figure 8:
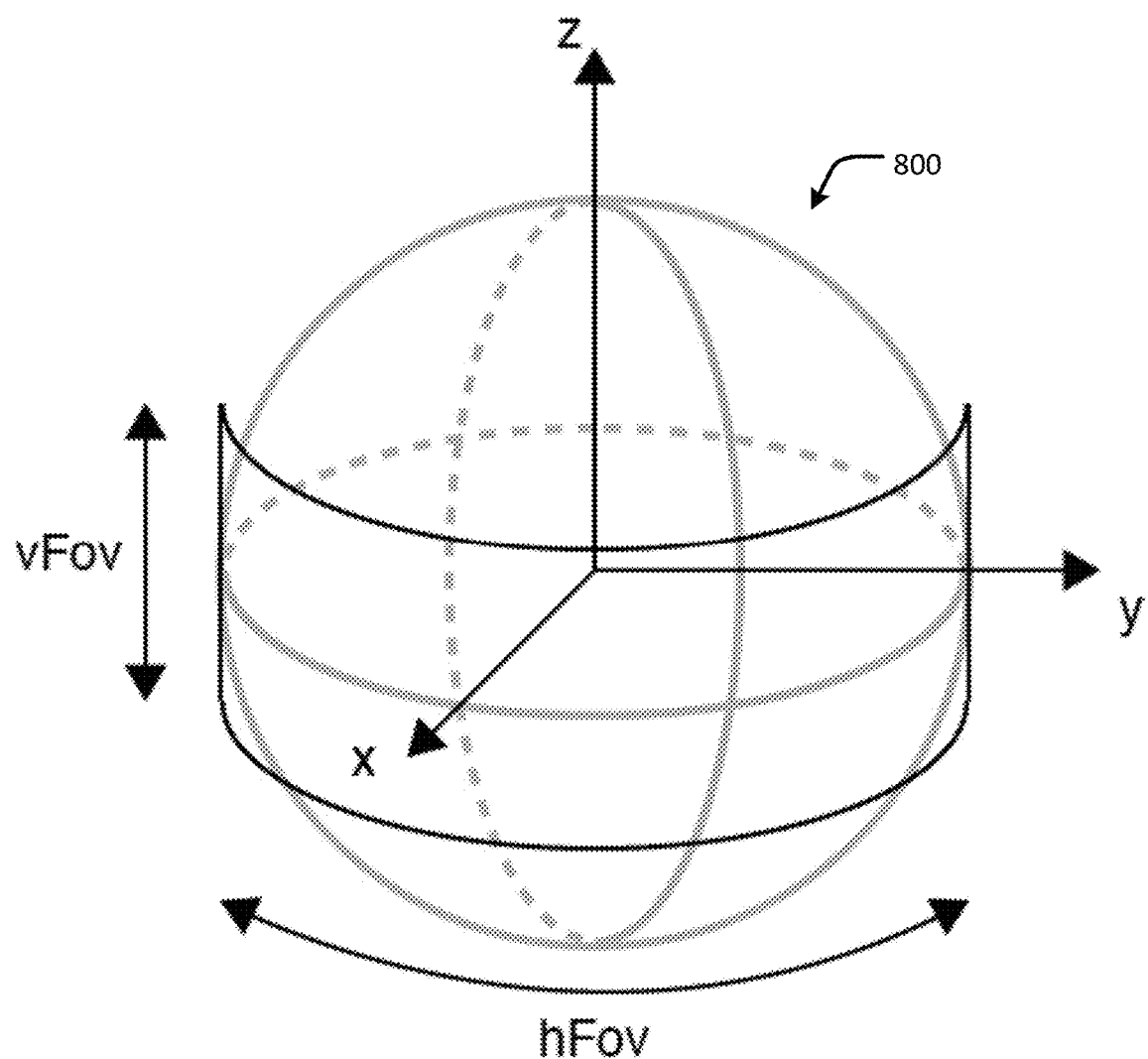

FIG. 8 shows another example image coordinate system 800 that can be used in conjunction with the techniques disclosed herein. In one example, mapping from UV coordinates to angles in the coordinate system 800 can be performed for a cylindrical projection, such as shown in FIG. 8, according to the following pseudo-code:

```
EulerAngles EulerAnglesAtUV(UV uv) {
    EulerAngles angles;
    float z = (cylindrical-mono-vFov/90.0) * sqrt(0.5) * (0.5 - uv.v);
    angles.theta = cylindrical-mono-hFov*(uv.u - 0.5);
    angles.phi = acos(z);
    angles.psi = 0.0;
    return angles;
}
```

Figure 9:
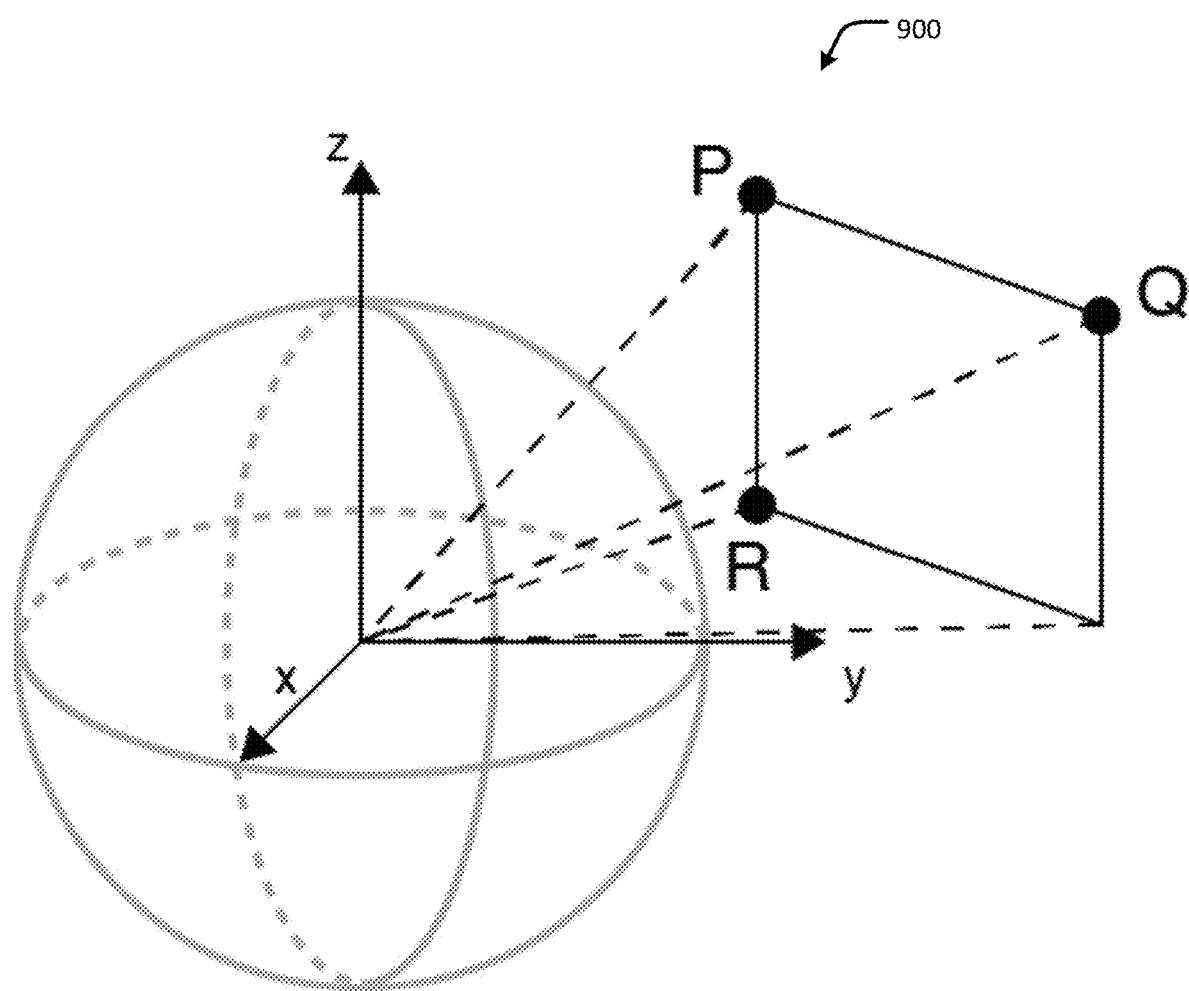

FIG. 9 shows another example image coordinate system 900 that can be used in conjunction with the techniques disclosed herein. In another example, mapping from UV coordinates to angles in the coordinate system 900 can be performed for a planar projection, such as shown in FIG. 9, according to the following pseudo-code:

```
EulerAngles EulerAnglesAtUV(UV uv) {
    // reconstruct point in space
    SpherePoint p = P;
    SpherePoint u = U;
    SpherePoint v = V;
    u.scale(uv.u);
    v.scale(uv.v);
    p += u;
    p += v;
    p.normalize();
    return SpherePointToEulerAngles(p);
}
SpherePoint SpherePointToEulerAngles(SpherePoint point) {
    point.normalize(); // we want the point vector to have length 1.0
    EulerAngles angles;
    angles.phi = acos(point.z);
    angles.theta = atan2(point.y, point.x);
    angles.psi = 0;
}
```

Figure 10:
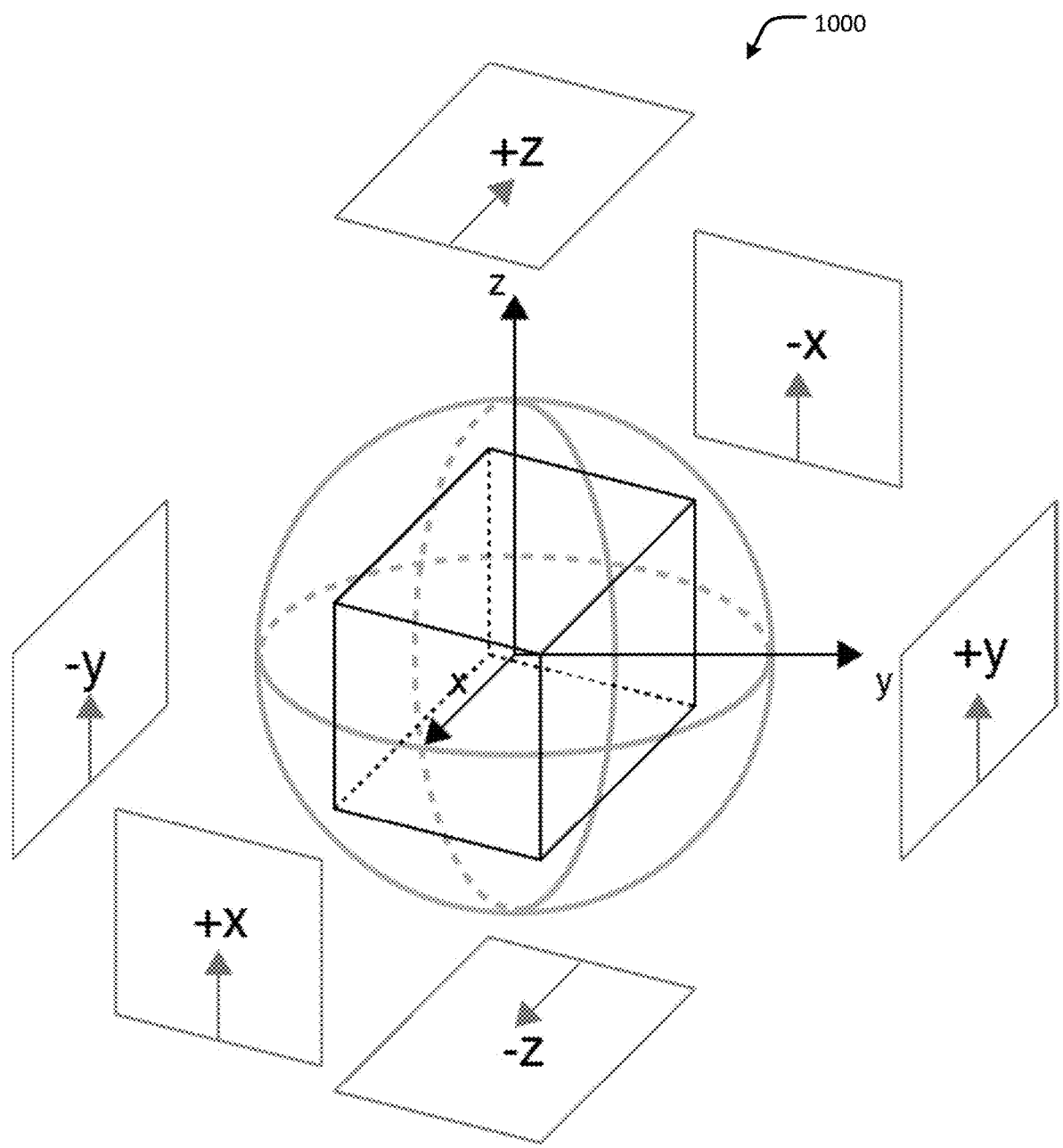

FIG. 10 shows another example image coordinate system 1000 that can be used in conjunction with the techniques disclosed herein. In yet another example, mapping from UV coordinates to angles in the coordinate system 1000 can be performed for a cubemap projection having a particular cubemap layout, such as shown in FIG. 10, according to the following pseudo-code:

```
UV UVfromCubeLayout(CubeLayout layout, Face face, UV uvIn){
    UV uv;
    float onesix = 1.0/6.0;
```

-continued

```
float onethree = 1.0/3.0;
if (layout == STRIP_pXnXpYnYpZnZ) {
switch(face) {
case pX:
uv.u = uvIn.u * onesix;
uv.v = uvIn.v;
break;
case nX:
uv.u = uvIn.u * onesix + onesix;
uv.v = uvIn.v;
break;
case pY:
uv.u = uvIn.u * onesix + 2.0*onesix;
uv.v = uvIn.v;
break;
case nY:
uv.u = uvIn.u * onesix + 3.0*onesix;
uv.v = uvIn.v;
break;
case pZ:
uv.u = uvIn.u * onesix + 4.0*onesix;
uv.v = uvIn.v;
break;
case nZ:
uv.u = uvIn.u * onesix + 5.0*onesix;
uv.v = uvIn.v;
break;
};
} else if (layout == 3x2_pXnXpYnYpZnZ){
switch(face) {
case pX:
uv.u = uvIn.u * onethree;
uv.v = uvIn.v * 0.5;
break;
case nX:
uv.u = uvIn.u * onethree + onethree;
uv.v = uvIn.v * 0.5;
break;
case pY:
uv.u = uvIn.u * onethree + 2.0* onethree;
uv.v = uvIn.v * 0.5;
break;
case nY:
uv.u = uvIn.u * onethree;
uv.v = uvIn.v * 0.5 + 0.5;
break;
case pZ:
uv.u = uvIn.u * onethree + onethree;
uv.v = uvIn.v * 0.5 + 0.5;
break;
case nZ:
uv.u = uvIn.u * onethree + 2.0*onethree;
uv.v = uvIn.v * 0.5 + 0.5;
break;
};
}
return uv;
}
UV, face UVFaceFromUV(UV uvIn, CubeLayout layout){
UV uvLocal;
Face face;
float onesix = 1.0/6.0;
float onethree = 1.0/3.0;
if (layout == STRIP_pXnXpYnYpZnZ) {
uvlocal.v = uvIn.v;
if (uvIn.u < onesix) {
uvlocal.u = uvIn.u / onesix;
face = pX;
} else if (uvIn.u < 2.0 * onesix){
uvlocal.u = (uvIn.u - onesix) / onesix;
face = nX;
} else if (uvIn.u < 3.0 * onesix){
uvlocal.u = (uvIn.u - 2.0 * onesix) / onesix;
face = pY;
} else if (uvIn.u < 4.0 * onesix){
uvlocal.u = (uvIn.u - 3.0 * onesix) / onesix;
face = nY;
} else if (uvIn.u < 5.0 * onesix){
uvlocal.u = (uvIn.u - 4.0 * onesix) / onesix;
face = pZ;
} else{
uvlocal.u = (uvIn.u - 5.0 * onesix) / onesix;
face = nZ;
}
} else if (layout == 3x2_pXnXpYnYpZnZ){
if (uvIn.v < 0.5){
uvlocal.v = uvIn.v / 0.5;
if (uvIn.u < onethree){
uvlocal.u = uvIn.u / onethree;
face = pX;
} else if (uvIn.u < 2.0 * onethree){
uvlocal.u = (uvIn.u - onethree) / onethree;
face = nX;
} else{
uvlocal.u = (uvIn.u - 2.0 * onethree) / onethree;
face = pY;
}
} else{
uvlocal.v = (uvIn.v - 0.5) / 0.5;
if (uvIn.u < onethree){
uvlocal.u = uvIn.u / onethree;
face = nY;
} else if (uvIn.u < 2.0 * onethree){
uvlocal.u = (uvIn.u - onethree) / onethree;
face = pZ;
} else{
uvlocal.u = (uvIn.u - 2.0 * onethree) / onethree;
face = nZ;
}
}
}
return uvLocal, face;
}
EulerAngles EulerAnglesAtUV(UV uv){
EulerAngles angles;
UV uvLocal;
Face face;
Point p;
float halfCubeEdge = sqrt(0.5);
uvLocal, face = UVFaceFromUV(uv, cubemap-mono-layout);
uvLocal.u = (uvLocal.u - 0.5) * 2.0 * halfCubeEdge;
uvLocal.v = (uvLocal.v - 0.5) * 2.0 * halfCubeEdge;
switch (face){
case pX:
p.x = halfCubeEdge;
p.y = uvLocal.u;
p.z = uvLocal.v;
break;
case nX:
p.x = -1.0 * halfCubeEdge;
p.y = -1.0 * uvLocal.u;
p.z = uvLocal.v;
break;
case pY:
p.x = -1.0 * uvLocal.u;
p.y = halfCubeEdge;
p.z = uvLocal.v;
break;
case nY:
p.x = uvLocal.u;
p.y = -1.0 * halfCubeEdge;
p.z = uvLocal.v;
break;
case pZ:
p.x = -1.0 * uvLocal.v;
p.y = uvLocal.u;
p.z = halfCubeEdge;
break;
case nZ:
p.x = uvLocal.v;
p.y = uvLocal.u;
p.z = -1.0 * halfCubeEdge;
break;
}
EulerAngles angles = SpherePointToEulerAngles(p);
return angles;
}
```

Figure 11:
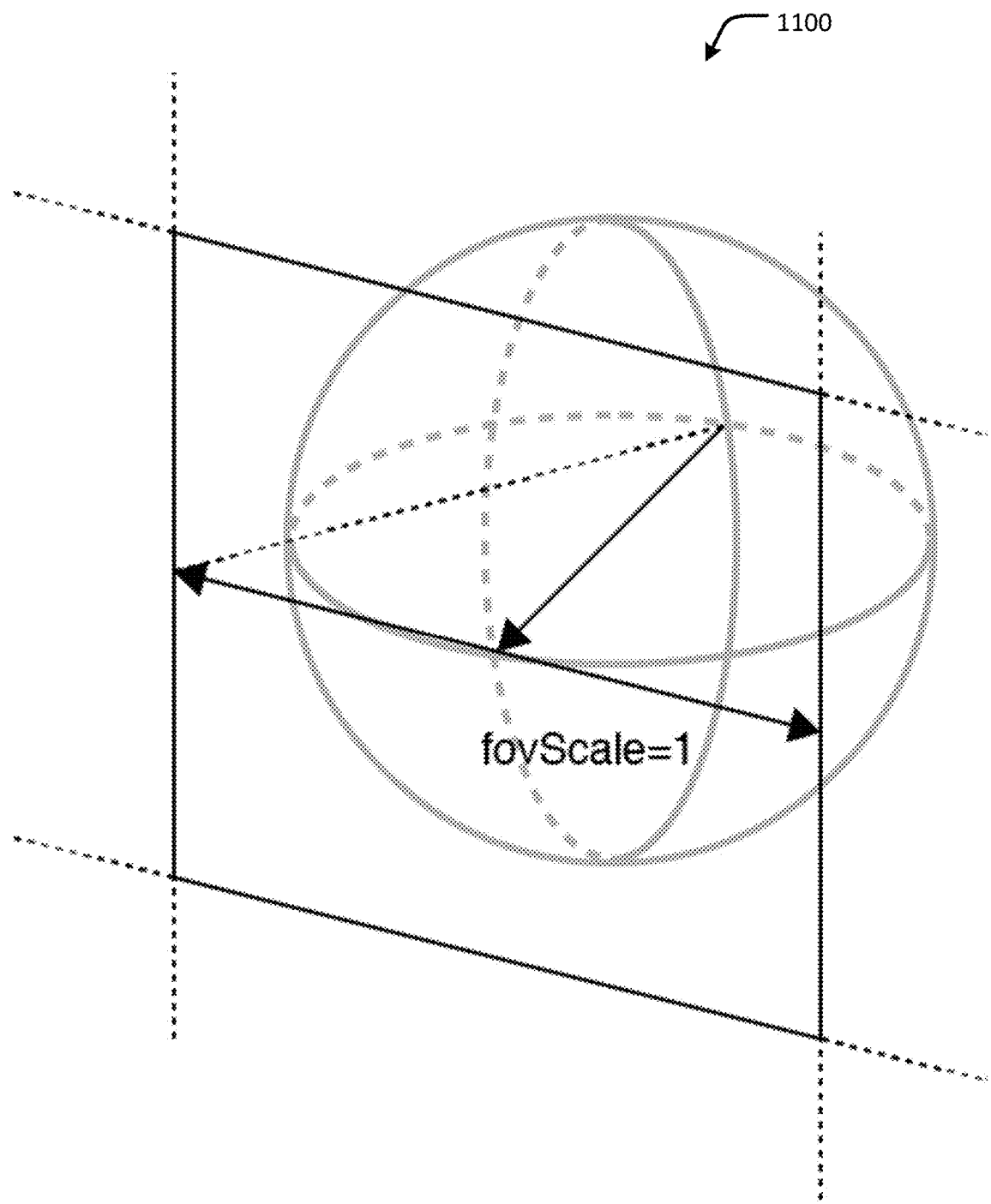

FIG. 11 shows another example image coordinate system 1100 that can be used in conjunction with the techniques disclosed herein. In yet another example, mapping from UV coordinates to angles in the coordinate system 1100 can be performed for a stereographic projection, such as shown in FIG. 11, according to the following pseudo-code:

```
EulerAngles EulerAnglesAtUV(UV uv) {
    float scaleFac = stereographic-mono-fovScale * 2.0;
    // 2.0 == 180 degrees
    float Y = scaleFac*(uv.u−0.5);
    float Z = scaleFac*((1.0−uv.v)−0.5);
    // see: https://en.wikipedia.org/wiki/
    Stereographic_projection#Definition
    SpherePoint pt;
    pt.z = 2*Z/(1+Z*Z + Y*Y);
    pt.y = 2*Y/(1+Z*Z + Y*Y);
    pt.x = −1*( −1+Z*Z + Y*Y)/(1+Z*Z + Y*Y);
    EulerAngles angles = SpherePointToEulerAngles(pt);
    return angles;
}
```

Figure 12:
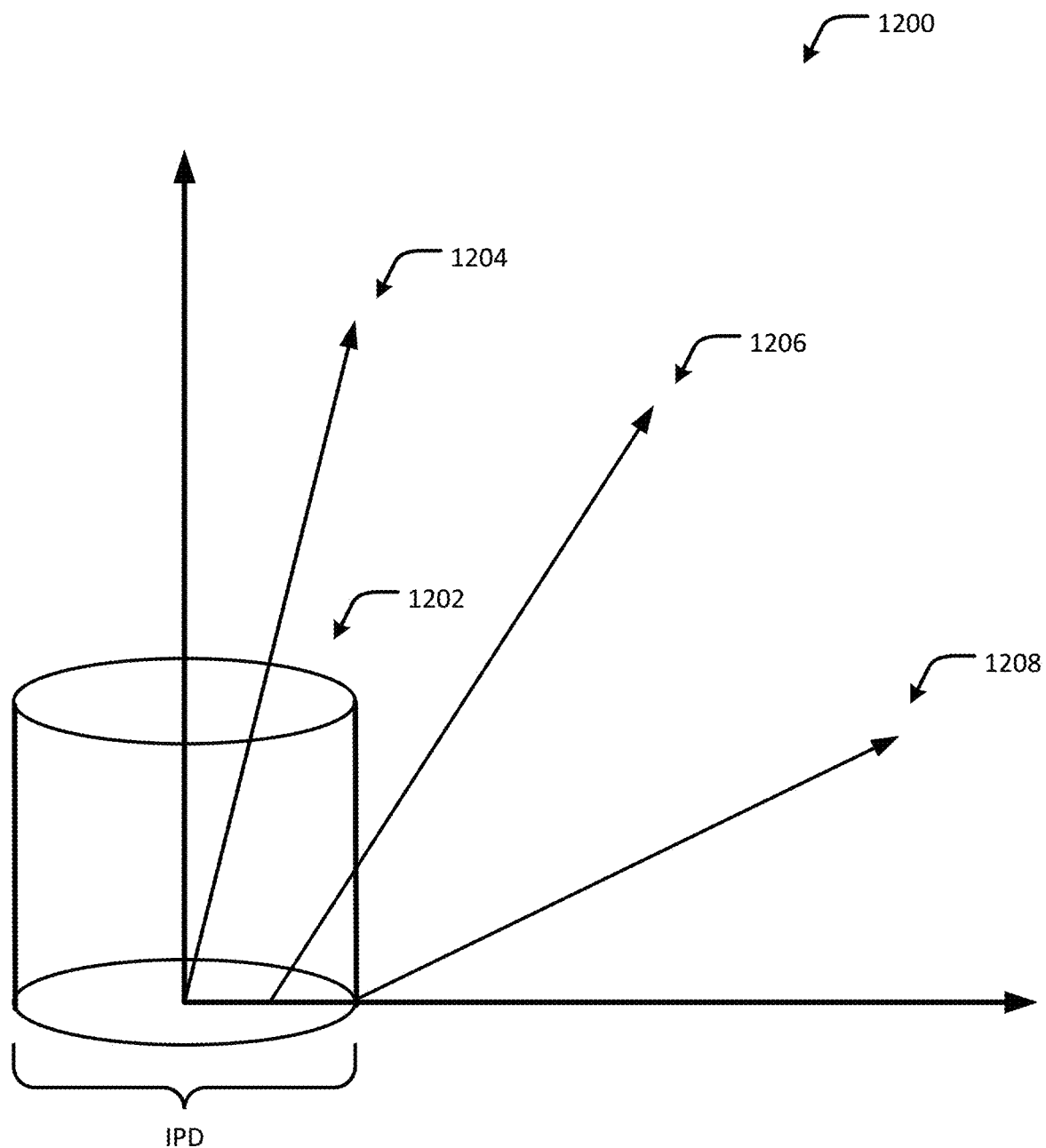
FIG. 12 shows an example image coordinate system for a stereographic panoramic projection, in accordance with an embodiment of the present disclosure.

FIG. 12 shows an example image coordinate system 1200 for a stereographic panoramic projection 1202, in accordance with an embodiment of the present disclosure. Also referring to FIG. 3, the next step of the method 300 is to map 310 the Euler angle coordinates to a ray in space by adding, for the stereo case, an offset to the origin coordinates of the ray. In this manner, the ray lies in space rather than simply being a vector centered at the origin. FIG. 12 shows several such rays 1204, 1206, 1208 at different offsets relative to the origin of the coordinate system. The offset depends on the stereo model, and more specifically, whether the pixel lies in the left or right sub-image, and the IPD (distance between the left and right eyes). In the monoscopic case, the ray origin maps to the origin, and the ray direction converts the Euler angles to a point in space. In the stereo case, the ray origin and direction depend on the stereo model used, such as omnidirectional or 180 degrees.

Figure 13:
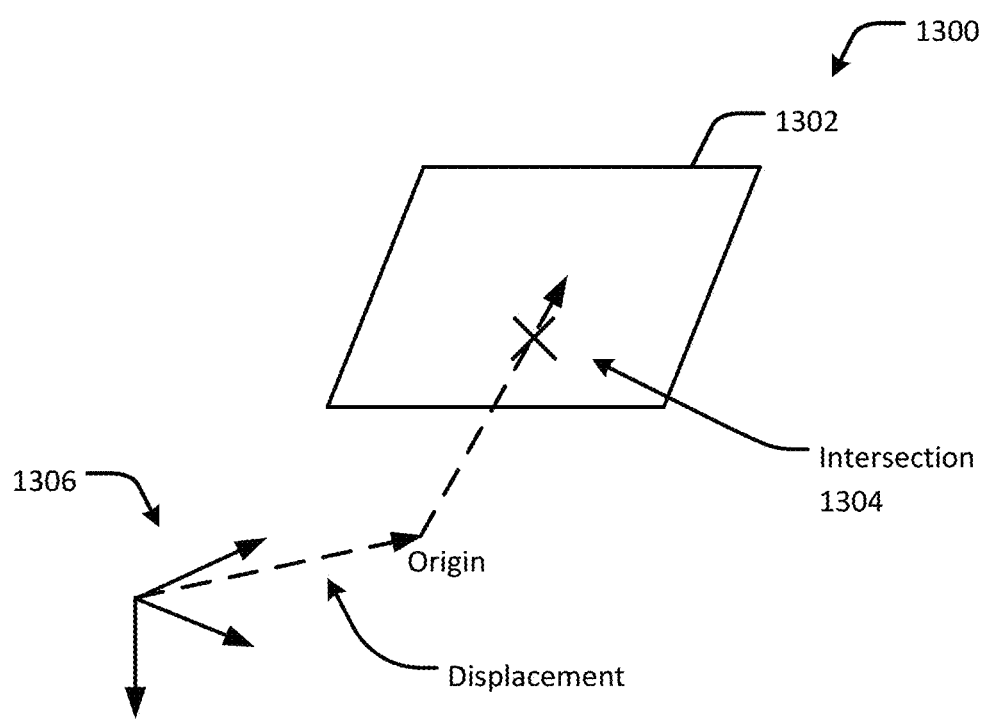
FIG. 13 shows an example image coordinate system for a planar panoramic projection, in accordance with an embodiment of the present disclosure.
Figure 14:
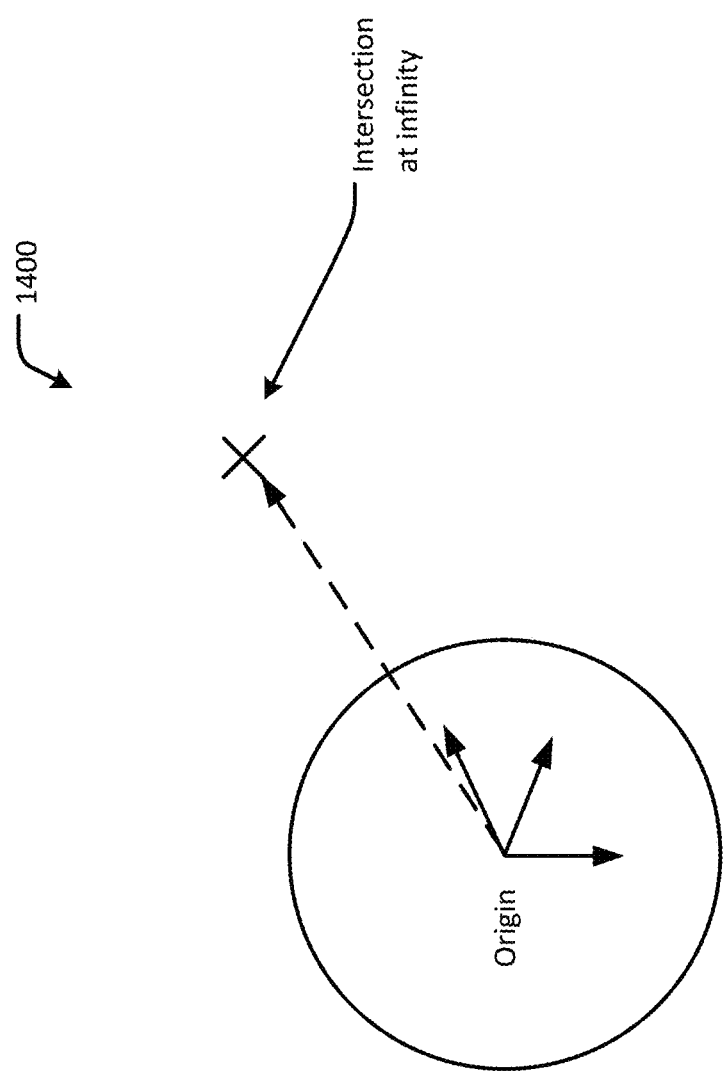
FIG. 14 shows an example image coordinate system for a non-planar panoramic projection, in accordance with an embodiment of the present disclosure.

FIG. 13 shows an example coordinate system 1300 for a planar panoramic projection 1302, in accordance with an embodiment of the present disclosure. FIG. 14 shows an example coordinate system 1400 for a non-planar panoramic projection 1402, in accordance with an embodiment of the present disclosure. Also referring to FIG. 3, the next step of the method 300 is to calculate 312 an intersection 1304 between the ray, as defined by the Euler angles, and the input projection geometry 1302, as shown in FIG. 13. The intersection of the ray and the input projection occurs at the UV coordinate of the input image, indicated in FIGS. 13 and 14 as an "X." With an input planar projection 1302, the plane can be rendered in space stereoscopically with stereo displacement (offset) relative to the reference frame 1306 of the output projection. For other types of input projections, the projection geometry is at infinity, which generalizes the origin to (0,0), such as shown in FIG. 14.

In one example, mapping from the ray to UV coordinates in the coordinate system 1400 of FIG. 14 can be performed for a cylindrical projection, such as shown in FIG. 8, according to the following pseudo-code:

```
UV UVAtEulerAngles(EulerAngles angles) {
    float localPhi = 90.0 − angles.phi;
    if (abs(localPhi) > cylindrical-mono-vFov*0.5)
    return null;
    float z = cos(angles.phi);
    UV uv;
    uv.u = 0.5 + (angles.theta/cylindrical-mono-hFov);
    uv.v = 0.5 − (z * 90.0)/(cylindrical-mono-vFov*sqrt(0.5));
    return uv;
}
```

In another example, mapping from the ray to UV coordinates in the coordinate system 1300 of FIG. 13 can be performed for a planar projection, such as shown in FIG. 9, according to the following pseudo-code:

```
void pointToNormalForm(SpherePoint P, SpherePoint Q,
    SpherePoint R, SpherePoint &U, SpherePoint &V,
    SpherePoint &N)
{
    U = Q−P;
    V = R−P;
    N = U.cross(V);
}
UV rayQuadIntersection(SpherePoint r, SpherePoint P,
    SpherePoint U, SpherePoint V,
    SpherePoint N)
{
    double eps = 1e−6;
    SpherePoint dR = r;
    dR.scale(−1.0);
    double NdotR = N.dot(dR);
    if (fabs(NdotR) < eps) {
    return null;
    }
    float t = N.dot(P) / NdotR;
    SpherePoint M = dR;
    M.scale(t);
    if (t>0) {
    return null;
    }
    SpherePoint dMP = M − P;
    UV ret;
    ret.u = dMP.dot(U)/U.dot(U);
    ret.v = dMP.dot(V)/V.dot(V);
    return ret;
}
// cache P, U, V, N where these functions can access them
UV UVAtEulerAngles(EulerAngles angles) {
    SpherePoint pt = EulerAnglesToSpherePoint(angles);
    return Math::rayQuadIntersection(pt, P, U, V, N);
}
```

In yet another example, mapping from the ray to UV coordinates in the coordinate system 1400 of FIG. 14 can be performed for a cubemap projection, such as shown in FIG. 10, according to the following pseudo-code:

```
UV UVfromCubeLayout(CubeLayout layout, Face face, UV uvIn) {
    UV uv;
    float onesix = 1.0/6.0;
    float onethree = 1.0/3.0;
    if (layout == STRIP_pXnXpYnYpZnZ) {
    switch(face) {
    case pX:
    uv.u = uvIn.u * onesix;
    uv.v = uvIn.v;
    break;
    case nX:
    uv.u = uvIn.u * onesix + onesix;
    uv.v = uvIn.v;
    break;
    case pY:
    uv.u = uvIn.u * onesix + 2.0*onesix;
    uv.v = uvIn.v;
    break;
    case nY:
    uv.u = uvIn.u * onesix + 3.0*onesix;
    uv.v = uvIn.v;
```

```
break;
case pZ:
uv.u = uvIn.u * onesix + 4.0*onesix;
uv.v = uvIn.v;
break;
case nZ:
uv.u = uvIn.u * onesix + 5.0*onesix;
uv.v = uvIn.v;
break;
};
} else if (layout == 3x2_pXnXpYnYpZnZ) {
switch(face) {
case pX:
uv.u = uvIn.u * onethree;
uv.v = uvIn.v * 0.5;
break;
case nX:
uv.u = uvIn.u * onethree + onethree;
uv.v = uvIn.v * 0.5;
break;
case pY:
uv.u = uvIn.u * onethree + 2.0* onethree;
uv.v = uvIn.v * 0.5;
break;
case nY:
uv.u = uvIn.u * onethree;
uv.v = uvIn.v * 0.5 + 0.5;
break;
case pZ:
uv.u = uvIn.u * onethree + onethree;
uv.v = uvIn.v * 0.5 + 0.5;
break;
case nZ:
uv.u = uvIn.u * onethree + 2.0*onethree;
uv.v = uvIn.v * 0.5 + 0.5;
break;
};
}
return uv;
}
UV, face UVFaceFromUV(UV uvIn, CubeLayout layout) {
UV uvLocal;
Face face;
float onesix = 1.0/6.0;
float onethree = 1.0/3.0;
if (layout == STRIP_pXnXpYnYpZnZ) {
uvlocal.v = uvIn.v;
if (uvIn.u < onesix) {
uvlocal.u = uvIn.u / onesix;
face = pX;
} else if (uvIn.u < 2.0 * onesix) {
uvlocal.u = (uvIn.u − onesix) / onesix;
face = nX;
} else if (uvIn.u < 3.0 * onesix) {
uvlocal.u = (uvIn.u − 2.0 * onesix) / onesix;
face = pY;
} else if (uvIn.u < 4.0 * onesix) {
uvlocal.u = (uvIn.u − 3.0 * onesix) / onesix;
face = nY;
} else if (uvIn.u < 5.0 * onesix) {
uvlocal.u = (uvIn.u − 4.0 * onesix) / onesix;
face = pZ;
} else {
uvlocal.u = (uvIn.u − 5.0 * onesix) / onesix;
face = nZ;
}
} else if (layout == 3x2_pXnXpYnYpZnZ) {
if (uvIn.v < 0.5) {
uvlocal.v = uvIn.v / 0.5;
if (uvIn.u < onethree) {
uvlocal.u = uvIn.u / onethree;
face = pX;
} else if (uvIn.u < 2.0 * onethree) {
uvlocal.u = (uvIn.u − onethree) / onethree;
face = nX;
} else {
uvlocal.u = (uvIn.u − 2.0 * onethree) / onethree;
face = pY;
}
} else {
uvlocal.v = (uvIn.v − 0.5) / 0.5;
if (uvIn.u < onethree) {
uvlocal.u = uvIn.u / onethree;
face = nY;
} else if (uvIn.u < 2.0 * onethree) {
uvlocal.u = (uvIn.u − onethree) / onethree;
face = pZ;
} else {
uvlocal.u = (uvIn.u − 2.0 * onethree) / onethree;
face = nZ;
}
}
}
return uvLocal, face;
}
UV UVAtEulerAngles(EulerAngles angles) {
SpherePoint pt;
EulerAnglesToSpherePoint(angles, pt);
float eps = 1e−6;
float t;
UV uvLocal;
UV uv;
if (fabs(pt.x)>eps) {
if (pt.x>0) {
t = 0.5/pt.x;
uvlocal.u = 0.5+t*pt.y;
uvLocal.v = 0.5+t*pt.z;
if (uvLocal.isValid()) {
return UVfromCubeLayout(cubemap-mono-layout, pX, uvLocal);
}
} else if (pt.x<0) {
t = −0.5/pt.x;
uvlocal.u = 0.5+t*pt.y*−1.0;
uvLocal.v = 0.5+t*pt.z;
if (uvLocal.isValid()) {
return UVfromCubeLayout(cubemap-mono-layout, nX, uvLocal);
}
}
}
if (fabs(pt.y)>eps) {
if (pt.y>0) {
t = 0.5/pt.y;
uvlocal.u = 0.5+t*pt.x*−1.0;
uvLocal.v = 0.5+t*pt.z;
if (uvLocal.isValid()) {
return UVfromCubeLayout(cubemap-mono-layout, pY, uvLocal);
}
} else if (pt.y<0) {
t = −0.5/pt.y;
uvlocal.u = 0.5+t*pt.x;
uvLocal.v = 0.5+t*pt.z;
if (uvLocal.isValid()) {
return UVfromCubeLayout(cubemap-mono-layout, nY, uvLocal);
}
}
}
if (fabs(pt.z)>eps) {
if (pt.z>0) {
t = 0.5/pt.z;
uvlocal.u = 0.5+t*pt.y;
uvLocal.v = 0.5+t*pt.x*−1.0;
if (uvLocal.isValid()) {
return UVfromCubeLayout(cubemap-mono-layout, pZ, uvLocal);
}
} else if (pt.z<0) {
t = −0.5/pt.z;
uvlocal.u = 0.5+t*pt.y;
uvLocal.v = 0.5+t*pt.x;
if (uvLocal.isValid()) {
return UVfromCubeLayout(cubemap-mono-layout, nZ, uvLocal);
}
}
}
return uv;
}
```

In yet another example, mapping from the ray to UV coordinates in the coordinate system 1400 of FIG. 14 can be performed for a stereographic projection, such as shown in FIG. 11, according to the following pseudo-code:

```
UV UVAtEulerAngles(EulerAngles angles) {
    SpherePoint pt = EulerAnglesToSpherePoint(angles);
    pt.x *= -1.0;
    float zcoord = -2.0*pt.z/(1.0-pt.x);
    float ycoord = -2.0*pt.y/(1.0-pt.x);
    float scaleFac = stereographic-mono-fovScale * 4.0;
    UV uv;
    uv.u = ycoord/scaleFac + 0.5;
    uv.v = zcoord/scaleFac + 0.5;
    return uv;
}
```

Figure 15:
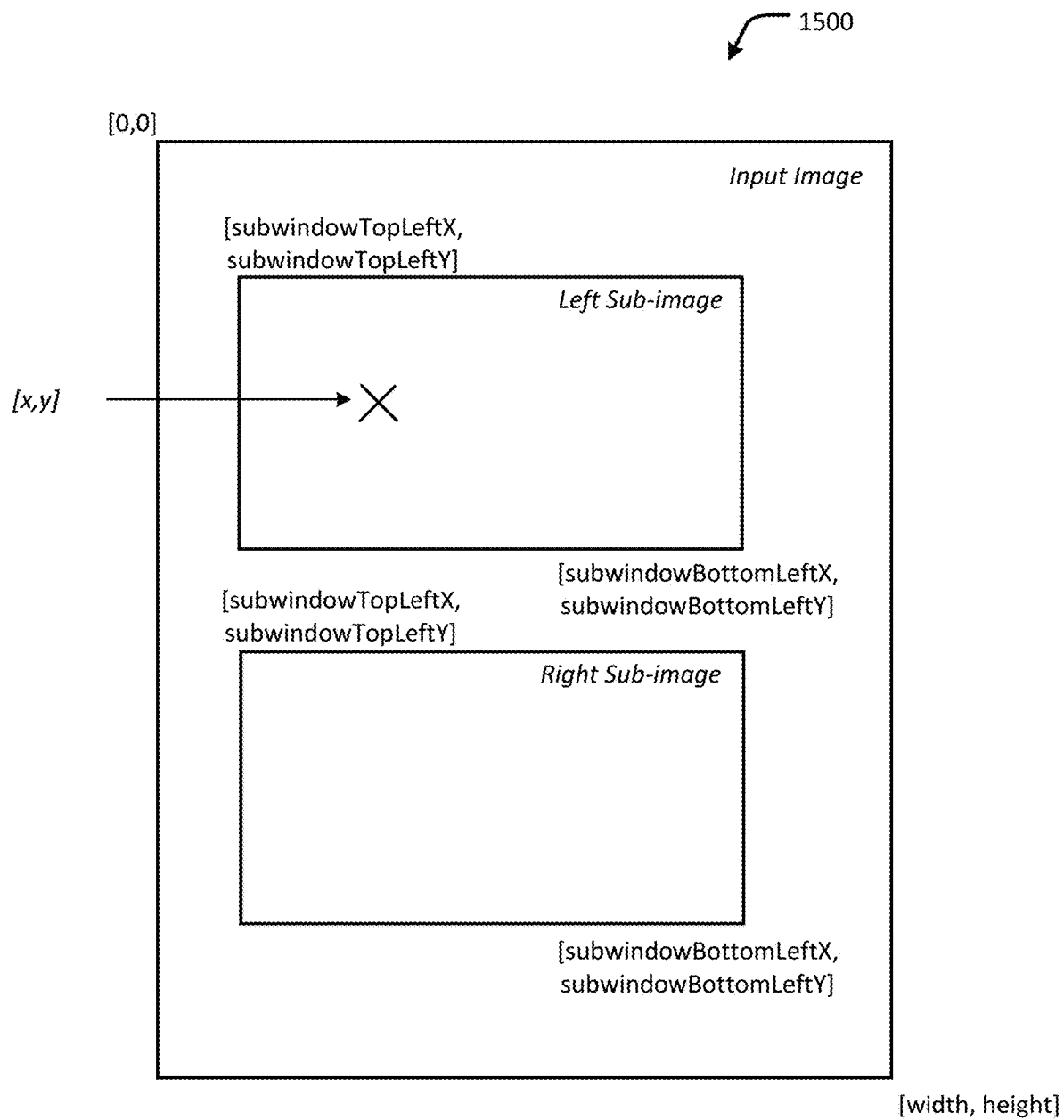
FIG. 15 shows an example input image, in accordance with an embodiment of the present disclosure.

FIG. 15 shows an example input image 1500, in accordance with an embodiment. Also referring to FIG. 3, the next step of the method 300 is to convert 314 the UV coordinate at each intersection with the input projection to a pixel coordinate [x, y] of the input texture using, for example, metadata associated with the input image 1500, indicated in FIG. 15 as an "X." The input image metadata defines the pixel coordinates in the input image and the corresponding UV coordinates in the input image. Then, for each intersection, metadata associated with a new panoramic image can be generated 316 based on the converted pixel in the input image. The combined panoramic image 320 represents a combination of the output image and the input image, modified by the mapping described above. The respective pixel of the input image can then be rendered at the position of the corresponding pixel in the output image.

Computing Device

Figure 16:
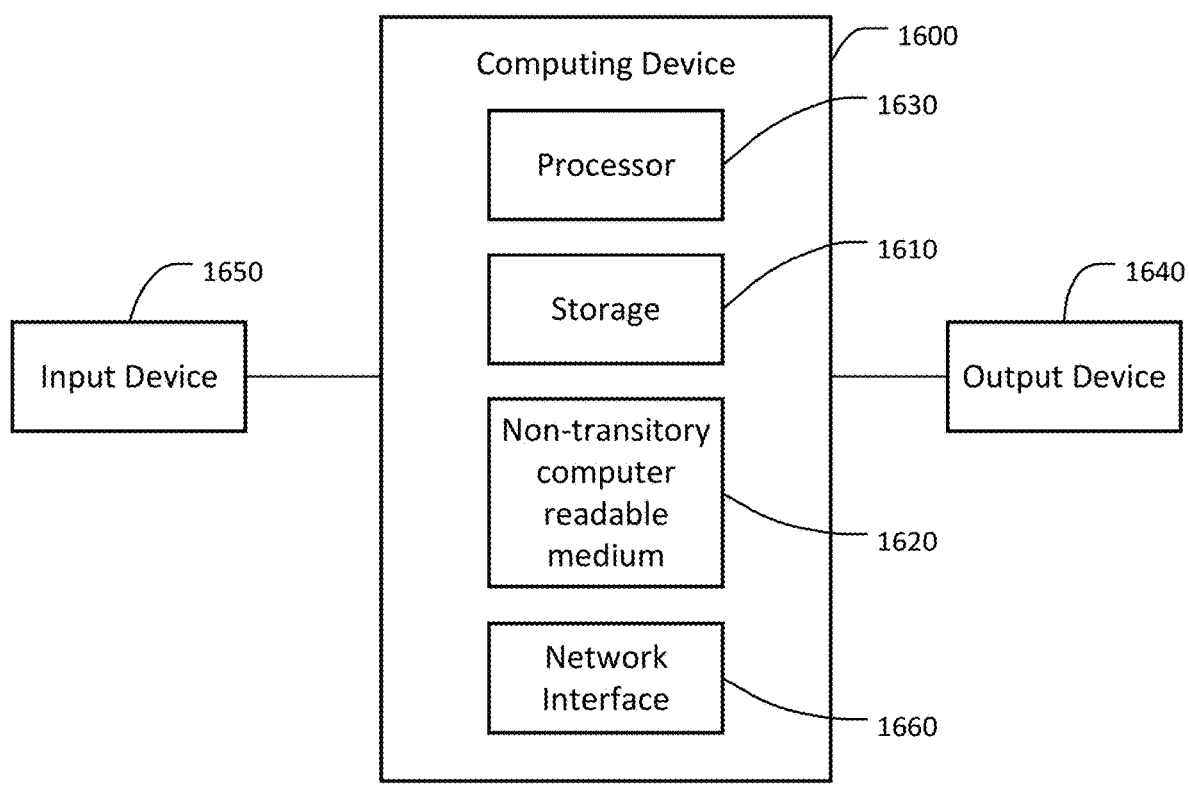
FIG. 16 is a block diagram representing an example computing device or system that may be used to perform any of the techniques as variously described in this disclosure.

FIG. 16 is a block diagram representing an example computing device 1600 that may be used to perform any of the techniques as variously described in this disclosure. For example, the system 100 of FIG. 1, or any portions thereof, and the methodology of FIG. 3, or any portions thereof, may be implemented in the computing device 1600. The computing device 1600 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system may be provided including a plurality of such computing devices.

The computing device 1600 includes one or more storage devices 1610 or non-transitory computer-readable media 1620 having encoded thereon one or more computer-executable instructions or software for implementing techniques as variously described in this disclosure. The storage devices 1610 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 1610 may include other types of memory as well, or combinations thereof. The storage device 1610 may be provided on the computing device 1600 or provided separately or remotely from the computing device 1600. The non-transitory computer-readable media 1620 may include, but are not limited to, one or more types of hardware memory, non-transitory tangible media (for example, one or more magnetic storage disks, one or more optical disks, one or more USB flash drives), and the like. The non-transitory computer-readable media 1620 included in the computing device 1600 may store computer-readable and computer-executable instructions or software for implementing various embodiments. The computer-readable media 1620 may be provided on the computing device 1600 or provided separately or remotely from the computing device 1600.

The computing device 1600 also includes at least one processor 1630 for executing computer-readable and computer-executable instructions or software stored in the storage device 1610 or non-transitory computer-readable media 1620 and other programs for controlling system hardware. Virtualization may be employed in the computing device 1600 so that infrastructure and resources in the computing device 1600 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1600 through an output device 1640, such as a screen or monitor, including an augmented reality display device, which may display one or more user interfaces provided in accordance with some embodiments. The output device 1640 may also display other aspects, elements or information or data associated with some embodiments. The computing device 1600 may include other I/O devices 1650 for receiving input from a user, for example, a keyboard, a joystick, a game controller, a pointing device (e.g., a mouse, a user's finger interfacing directly with a touch-sensitive display device, etc.), or any suitable user interface, including an AR headset. The computing device 1600 may include other suitable conventional I/O peripherals. The computing device 1600 includes or is operatively coupled to various suitable devices for performing one or more of the aspects as variously described in this disclosure.

The computing device 1600 may run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 100 or 300 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having several input/output ports for receiving and outputting data, and several embedded routines for carrying out the functionality described in this disclosure. In a more general sense, any suitable combination of hardware, software, and firmware can be used, as will be apparent.

As will be appreciated in light of this disclosure, the various modules and components of the system, such as the modules 150-160, the GUI 150, or any combination of these, is implemented in software, such as a set of instructions (e.g., HTML, XML, C, C++, object-oriented C, JavaScript®, Java®, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 100, may be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment provides, in a digital medium environment for editing digital images, a computer-implemented method for generating a panoramic image from different panoramic projections. The method includes calculating, by the at least one processor and for each of a plurality of pixels in an output image, Euler angle coordinates at first UV coordinates corresponding to the respective pixel; mapping, by the at least one processor and for each of the pixels in the output image, the Euler angle coordinates to a geometric ray; and calculating, by the at least one processor and for each geometric ray, second UV coordinates corresponding to an intersection between the respective geometric ray and a pixel of an input image. The method further includes converting, by the at least one processor and for each intersection, the second UV coordinates at the respective intersection to one of the pixels in the input image; and generating, by the at least one processor and for each intersection, a combined panoramic image, metadata descriptive of the combined panoramic image, or both, the generating being based on the converted pixel in the input image, the combined panoramic image representing a combination of the output image and the input image. In some cases, the method includes determining, by the at least one processor and for each pixel in an output image, whether the respective pixel is within a left eye sub-window of the output image or within a right eye sub-window of the output image. In some such cases, the ray has an origin in a coordinate system based at least in part on the determination of whether the respective pixel is within the left eye sub-window of the output image or within the right eye sub-window of the output image. In some other such cases, mapping the Euler angle coordinates to the ray includes offsetting the ray from the origin of the coordinate system based on an interpupillary distance associated with the output image. In some cases, at least one of the output image and the input image represents a stereoscopic panoramic projection. In some cases, the output image represents a first panoramic projection, wherein the input image represents a second panoramic projection, and wherein optics of the first panoramic projection and optics of the second panoramic projection are mismatched. In some cases, at least one of the output image and the input image represents a monoscopic panoramic projection. Another example embodiment provides a computer program product including one or more non-transitory machine-readable mediums having instructions encoded thereon that when executed by one or more processors cause the one or more computer processors to perform a process such as set forth in this paragraph.

Another example embodiment provides a system for converting panoramas between different panoramic projections. The system includes at least one processor and a storage operatively coupled to the at least one processor and for storing instructions that when executed by the at least one processor cause the at least one processor to obtain, for each of a plurality of pixels in an output image, UV coordinates corresponding to the respective pixel in the output image based on metadata associated with the output image, wherein the UV coordinates represent a two-dimensional texture associated with the respective pixel in the output image. The system is further configured to calculate, for each of the pixels in the output image, Euler angle coordinates at the respective UV coordinates based on the metadata associated with the output image; and map, for each of the pixels in the output image, the Euler angle coordinates to a geometric ray; and calculating, by the at least one processor and for each geometric ray, an intersection between the respective geometric ray and an input image, wherein the intersection represents UV coordinates corresponding to one of a plurality of pixels in an input image. The system is further configured to convert, for each intersection, the UV coordinates at the respective intersection to one of the pixels in the input image based on metadata associated with the input image; and generate, for each intersection, a combined panoramic image, metadata descriptive of the combined panoramic image, or both, the generating being based on the converted pixel in the input image, the combined panoramic image representing a combination of the output image and the input image. In some cases, the system is configured to determine, for each pixel in an output image, whether the respective pixel is within a left eye sub-window of the output image or within a right eye sub-window of the output image. In some such cases, the ray has an origin in a coordinate system based at least in part on the determination of whether the respective pixel is within the left eye sub-window of the output image or within the right eye sub-window of the output image. In some other such cases, mapping the Euler angle coordinates to the ray includes offsetting the ray from the origin of the coordinate system based on an interpupillary distance associated with the output image. In some cases, at least one of the output image and the input image represents a stereoscopic panoramic projection. In some cases, the output image represents a first panoramic projection, wherein the input image represents a second panoramic projection, and wherein optics of the first panoramic projection and optics of the second panoramic projection are mismatched. In some cases, at least one of the output image and the input image represents a monoscopic panoramic projection.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. In a digital medium environment for editing digital images, a computer-implemented method for generating a panoramic image from different panoramic projections, the method comprising:

determining, by at least one processor, whether a pixel in a stereoscopic panoramic projection output image is within a left eye sub-window of the output image or within a right eye sub-window of the output image;

calculating, by at the least one processor, Euler angle coordinates at first UV coordinates corresponding to the respective pixel, wherein the first UV coordinates represent an output pixel in the output image;

mapping, by the at least one processor, the Euler angle coordinates to a geometric ray offset from an origin of a coordinate system based at least in part on the determination of whether the respective pixel is within the left eye sub-window of the output image or within the right eye sub-window of the output image;

calculating, by the at least one processor and for each geometric ray, second UV coordinates corresponding to an intersection between the respective geometric ray and a pixel of an input image, wherein the second UV coordinates represent an input pixel in the input image, wherein the input pixel is different from the output pixel, wherein the output image and the input image are different images obtained using at least two different cameras;

converting, by the at least one processor and for each intersection, the second UV coordinates at the respective intersection to one of the pixels in the input image; and generating, by the at least one processor and for each intersection, a combined panoramic image, metadata descriptive of the combined panoramic image, or both, the generating being based on the converted pixel in the input image, the combined panoramic image representing a combination of the output image and the input image.

2. The method of claim 1, wherein the input image is a planar projection, and wherein the ray is offset from the origin of the coordinate system relative to a reference frame of the output image.

3. The method of claim 1, wherein the input image is a planar projection, and wherein the method includes determining an intersection between the respective geometric ray and a plane of the planar projection.

4. The method of claim 3, wherein the plane of the planar projection is offset relative to a reference frame of the output image.

5. The method of claim 1, wherein the input image is a non-planar projection, and wherein ray is offset from the origin of the coordinate system by zero.

6. The method of claim 1, wherein the ray is offset from the origin of the coordinate system based on an interpupillary distance associated with the output image.

7. The method of claim 1, wherein the output image represents a first panoramic projection, wherein the input image represents a second panoramic projection, and wherein optics of the first panoramic projection and optics of the second panoramic projection are mismatched.

8. The method of claim 1, wherein the input image represents a monoscopic panoramic projection.

9. In a digital medium environment for editing digital images, a computer-implemented method for generating a panoramic image from different panoramic projections, the method comprising:

calculating, by at least one processor, Euler angle coordinates at first UV coordinates corresponding to the respective pixel, wherein the first UV coordinates represent an output pixel in the output image;

mapping, by the at least one processor, the Euler angle coordinates to a geometric ray;

calculating, for each geometric ray, second UV coordinates corresponding to an intersection between the respective geometric ray and a pixel of an input image, wherein the second UV coordinates represent an input pixel in the input image, wherein the input pixel is different from the output pixel, wherein the output image and the input image are different images obtained using at least two different cameras;

determining, by the at least one processor, whether a pixel in a stereoscopic panoramic projection input image is within a left eye sub-window of the input image or within a right eye sub-window of the input image;

converting, for each intersection, the UV coordinates at the respective intersection to one of the pixels in the input image based at least in part on the determination of whether the respective pixel is within the left eye sub-window of the input image or within the right eye sub-window of the input image; and generating, for each intersection, a combined panoramic image, metadata descriptive of the combined panoramic image, or both, the generating being based on the converted pixel in the input image, the combined panoramic image representing a combination of the output image and the input image.

10. The method of claim 9, wherein mapping the Euler angle coordinates to the ray includes offsetting the ray from the origin of the coordinate system based on an interpupillary distance associated with the output image.

11. The method of claim 9, wherein the output image represents a stereoscopic panoramic projection.

12. The method of claim 9, wherein the output image represents a first panoramic projection, wherein the input image represents a second panoramic projection, and wherein optics of the first panoramic projection and optics of the second panoramic projection are mismatched.

13. The method of claim 9, wherein the output image represents a monoscopic panoramic projection.

14. A system for generating a panoramic image from different panoramic projections, the system comprising:

at least one processor; and a storage operatively coupled to the at least one processor and for storing instructions that when executed by the at least one processor cause the at least one processor to determine whether a pixel in a stereoscopic panoramic projection output image is within a left eye sub-window of the output image or within a right eye sub-window of the output image;

calculate Euler angle coordinates at first UV coordinates corresponding to the respective pixel, wherein the first UV coordinates represent an output pixel in the output image;

map the Euler angle coordinates to a geometric ray based at least in part on the determination of whether the respective pixel is within the left eye sub-window of the output image or within the right eye sub-window of the output image;

calculate second UV coordinates corresponding to an intersection between the respective geometric ray and a pixel of an input image, wherein the second UV coordinates represent an input pixel in the input image, wherein the input pixel is different from the output pixel, wherein the output image and the input image are different images obtained using at least two different cameras;

convert the second UV coordinates at the respective intersection to one of the pixels in the input image; and generate a combined panoramic image, metadata descriptive of the combined panoramic image, or both, the generating being based on the converted pixel in the input image, the combined panoramic image representing a combination of the output image and the input image.

15. The system of claim 14, wherein the ray is offset from an origin of a coordinate system based on an interpupillary distance associated with the output image.

16. The system of claim 14, wherein the output image represents a first panoramic projection, wherein the input image represents a second panoramic projection, and wherein optics of the first panoramic projection and optics of the second panoramic projection are mismatched.

17. The system of claim 14, wherein the first UV coordinates represent a two-dimensional texture of a first three-dimensional surface associated with the respective pixel in the output image.

18. The system of claim 14, wherein the second UV coordinates represent a two-dimensional texture of a second three-dimensional surface associated with the respective pixel in the input image.

19. The system of claim 14, wherein the first UV coordinates represent a two-dimensional texture of a first three-dimensional surface associated with the respective pixel in the output image, wherein the second UV coordinates represent a two-dimensional texture of a second three-dimensional surface associated with the respective pixel in the input image, and wherein the first three-dimensional surface of the output image is different from the second three-dimensional surface of the input image.

20. The system of claim 14, wherein the combined panoramic image retains at least a portion of content of the output image and at least a portion of content of the input image.

* * * * *